United States Patent
Nagai et al.

(10) Patent No.: US 8,106,703 B2
(45) Date of Patent: Jan. 31, 2012

(54) BOOSTER CIRCUIT

(75) Inventors: Yoshihiro Nagai, Kawasaki (JP);
Masakazu Amanai, Kawasaki (JP);
Masahiko Kashimura, Kawasaki (JP);
Masato Taki, Miyoshi (JP); Norihiro Honda, Toyota (JP); Kazushi Yamanaka, Ichinomiya (JP)

(73) Assignees: Renesas Electronics Corporation, Kanagawa (JP); Toyota Jidosha Kabushiki Kaisha, Aichi-ken (JP)

( * ) Notice: Subject to any disclaimer, the term of this patent is extended or adjusted under 35 U.S.C. 154(b) by 79 days.

(21) Appl. No.: 12/776,586

(22) Filed: May 10, 2010

(65) Prior Publication Data

US 2010/0301927 A1     Dec. 2, 2010

(30) Foreign Application Priority Data

May 26, 2009   (JP) ................................ 2009-126407

(51) Int. Cl.
*G05F 1/10*   (2006.01)
*G05F 3/02*   (2006.01)
(52) U.S. Cl. ...................................................... 327/536
(58) Field of Classification Search ................ 327/536; 363/59–60
See application file for complete search history.

(56) References Cited

U.S. PATENT DOCUMENTS

| 5,889,428 A | * | 3/1999 | Young ............................ 327/536 |
| 6,046,626 A | * | 4/2000 | Saeki et al. .................... 327/536 |
| 6,515,535 B2 | * | 2/2003 | Myono .......................... 327/536 |

FOREIGN PATENT DOCUMENTS

| JP | 2005012903 A | * | 1/2005 |
| JP | 2005-129815 A |  | 5/2005 |

* cited by examiner

*Primary Examiner* — Quan Tra
(74) *Attorney, Agent, or Firm* — Sughrue Mion, PLLC

(57) ABSTRACT

Booster circuit comprising: first transistor that is connected to first node; capacitor that has one end connected to first node, and that is charged with voltage of first node when first transistor is activated; and control signal generating circuit that provides control terminal of first transistor with control signal being in accordance with first clock, wherein when first transistor is de-activated, capacitor boosts voltage of first node to first voltage by voltage being applied to or end of capacitor, voltage applied to or end being at least ½ as great as first supply voltage, and control signal generating circuit sets voltage of control signal when first transistor is de-activated to be first voltage of first node, and sets voltage of control signal when first transistor is activated to be voltage, difference between voltage and first voltage being equal to or smaller than value of first supply voltage.

16 Claims, 24 Drawing Sheets

|  | | OUT110 | OUT110B | N111 | N112 |
|---|---|---|---|---|---|
| IN 110 | L (GND) | 1/2VDD | 3/2VDD | VDD−Vtn | 1/2VDD |
| | H (VDD) | 3/2VDD | 1/2VDD | 1/2VDD | VDD−Vtn |

Fig. 6

| IN111 | OUT111 | OUT111B | N121 | N122 | N131 | N132 | N141 | N142 |
|---|---|---|---|---|---|---|---|---|
| L (GND) | VDD | 2VDD | VDD−Vtn | 1/2VDD | 3/2VDD | 1/2VDD | 3/2VDD−Vtn | VDD |
| H (VDD) | 2VDD | VDD | 1/2VDD | VDD−Vtn | 1/2VDD | 3/2VDD | VDD | 3/2VDD−Vtn |

Fig. 7

|  |  | OUT210 | OUT210B | N211 | N212 |
|---|---|---|---|---|---|
| IN 210 | L (GND) | -1/2VDD | 1/2VDD | GND | 1/2VDD |
|  | H (VDD) | 1/2VDD | -1/2VDD | 1/2VDD | GND |

Fig. 12

| IN 211 | | OUT211 | OUT211B | N221 | N222 | N231 | N232 | N241 | N242 |
|---|---|---|---|---|---|---|---|---|---|
| | L (GND) | -VDD | GND | GND | 1/2VDD | 1/2VDD | -1/2VDD | GND | -1/2VDD +Vtp |
| | H (VDD) | GND | -VDD | 1/2VDD | GND | -1/2VDD | 1/2VDD | -1/2VDD +Vtp | GND |

Fig. 13

| | | OUT10 | OUT10B |
|---|---|---|---|
| IN 10 | L (GND) | GND | 2VDD |
| | H (VDD) | 2VDD | GND |

Fig. 17

|  |  | OUT10 | OUT10B |
|---|---|---|---|
| IN10 | L (GND) | −VDD | VDD |
|  | H (VDD) | VDD | −VDD |

Fig. 20

|  |  | OUT10 | OUT10B | N11 | N12 | N21 | N22 |
|---|---|---|---|---|---|---|---|
| IN 10 | L (GND) | GND | 2VDD | 2VDD | VDD+Vtp | VDD−Vtn | GND |
|  | H (VDD) | 2VDD | GND | VDD+Vtp | 2VDD | GND | VDD−Vtn |

Fig. 22

|  |  | OUT10 | OUT10B | N11 | N12 | N21 | N22 |
|---|---|---|---|---|---|---|---|
| IN 10 | L (GND) | −VDD | VDD | VDD | Vtp | −Vtn | −VDD |
|  | H (VDD) | VDD | −VDD | Vtp | VDD | −VDD | −Vtn |

Fig. 24

BOOSTER CIRCUIT

INCORPORATION BY REFERENCE

This application is based upon and claims the benefit of priority from Japanese patent application No. 2009-126407, filed on May 26, 2009, the disclosure of which is incorporated herein in its entirety by reference.

BACKGROUND

1. Field of the Invention

The present invention relates to a booster circuit.

2. Description of Related Art

FIG. 14 shows a positive potential booster circuit 1 in accordance with a related art. As shown in FIG. 14, the booster circuit 1 includes PMOS transistors MP1 and MP2, a capacitor C1, level shifters LS1 and LS2, and an amplifier AMP1. The PMOS transistor MP1 is connected between a supply voltage terminal VDD and a node N1. To the gate of the PMOS transistor MP1, an output signal of the level shifter LS1 is provided. The PMOS transistor MP2 is connected between the node N1 and a node N2. To the gate of the PMOS transistor MP2, an output signal of the level shifter LS2 is provided.

The level shifter LS1 receives a clock signal CLK1, and provides an output clock signal to the gate of the PMOS transistor MP1. The level shifter LS1 is supplied with a high-potential supply voltage from the node N1 and supplied with a low-potential supply voltage from a ground terminal GND. The level shifter LS2 receives a clock signal CLK2, and provides an output clock signal to the gate of the PMOS transistor MP2. The level shifter LS2 is supplied with a high-potential power supply from an output terminal OUT1 and supplied with a low-potential power supply from a ground terminal GND. Note that, for the sake of convenience, the reference characters "VDD" and "GND" not only denote the names of the terminals, but also denote the voltages supplied from the terminals. The voltage of the output terminal OUT1 is denoted by VOUT.

One end of the capacitor C1 is connected to the output of the amplifier AMP1, and the other end of the capacitor C1 is connected to the node N1. The amplifier AMP1 receives a clock signal CLK3, and provides an output clock signal to the one end of the capacitor C1. Note that, the amplifier AMP 1 is supplied with a high-potential power supply from a supply voltage terminal VDD and supplied with a low-potential power supply from a ground terminal GND.

FIG. 15 is a timing chart that shows the operation of the booster circuit 1. As shown in FIG. 15, during the period from time points t1 to t2, the clock signal CLK1 is at low level and the PMOS transistor MP1 is in ON state. Hence, the supply voltage terminal VDD and the node N1 are electrically connected to each other, causing the potential of the node N1 to be the supply voltage VDD. On the other hand, since the clock signal CLK3 is at low level during this period, the potential of the one end of the capacitor C1 is the ground voltage GND, and the capacitor C1 is charged.

During the period from time points t3 to t6, the clock signal CLK3 is at high level, and the potential of the other end of the capacitor C1 is the supply voltage VDD. This boosts the potential of the one end of the charged capacitor C1, and causes the potential of the node N1 to be 2 VDD. During the period from time points t4 to t5, the clock signal CLK2 is at low level, and the PMOS transistor MP2 is in ON state. Hence, the node N1 and the output terminal OUT 1 are electrically connected to each other, causing the output voltage VOUT to be 2VDD.

Here, during the period from time points t3 to t6, the potential of the node N1 is 2VDD. Therefore, in order to prevent backflow of current at the supply voltage terminal VDD, it is necessary to turn off the PMOS transistor MP1 during the period from time points t2 to t6. Hence, the level shifter LS1 structured as shown in FIG. 16 is used for turning off the PMOS transistor MP1 during the period from time points t2 to t6.

FIG. 16 shows the detailed circuit structure of the level shifter LS1. Note that the level shifter LS2 is similarly structured. The level shifter LS1 includes PMOS transistors MP11 and MP12, NMOS transistors MN11 and MN12, an input terminal IN10, output terminals OUT10 and OUT10B, and an inverter circuit IV10.

The PMOS transistor MP11 is connected between the node N1 and the output terminal OUT10B. The gate of the PMOS transistor MP11 is connected to the output terminal OUT10. The PMOS transistor MP12 is connected between the node N1 and the output terminal OUT10. The gate of the PMOS transistor MP12 is connected to the output terminal OUT10B. The NMOS transistor MN11 is connected between the output terminal OUT10B and a ground terminal GND. The gate of the NMOS transistor MN11 is connected to the input terminal IN10. The NMOS transistor MN12 is connected between the output terminal OUT10 and the ground terminal GND. The gate of the NMOS transistor MN12 is connected to the output terminal of the inverter circuit IV 10.

FIG. 17 shows a table representing the relationship between the clock signal CLK1 received at the input terminal IN10 and the potential of the output terminal OUT10 (and that of the inverted output terminal OUT10B) of the level shifter LS1. As can be seen, when the clock signal CLK1 is at low level (when "L" in the table), the output of the level shifter LS1 is a potential of the ground voltage GND; when the clock signal CLK1 is at high level (when "H" in the table), the output of the level shifter LS1 is a potential of 2VDD.

Here, the potential difference between the high level power supply of the level shifter LS1 and the low level power supply of the same is 2×VDD. Therefore, the PMOS transistors MP11 and MP12 and the NMOS transistors MN11 and MN12 must be structured with high-voltage transistors that can withstand a potential difference twice as great as the supply voltage VDD. However, a high-voltage transistor requires a thickened gate oxide film. The thicker the gate oxide film, the greater the required channel length. Hence, such a thick-film transistor poses a problem of an increased layout area.

FIG. 18 shows the structure of a booster circuit 2 that generates a negative voltage −VDD. As shown in FIG. 18, the booster circuit 2 includes NMOS transistor MN1 and MN2, a capacitor C1, level shifters LS3 and LS4, and an amplifier AMP1. The operation timing chart of the booster circuit 2 is basically similar to that shown in FIG. 15 except for the polarity of the booster circuit 1 and, therefore, it is omitted. FIG. 19 shows the structure of the level shifter LS3 (and that of LS4). FIG. 20 is a table showing the relationship between the clock signal CLK1 received at the input terminal IN10 and the potential of the output terminal OUT10 (and that of an inverted output terminal OUT10B) of the level shifter LS3. Similarly to the level shifter LS1, in the level shifter LS3 also, the potential difference between the high level power supply and the low level power supply is 2×VDD. Therefore, the PMOS transistors MP11 and MP12 and the NMOS transistors MN11 and MN12 must be structured with high-voltage transistors.

One exemplary booster circuit in accordance with prior art is disclosed in Japanese Unexamined Patent Application Publication No. 2005-129815. However, the technique disclosed therein is also based on use of high-voltage transistors, similarly to the booster circuit 1.

SUMMARY

In connection with a one-chip integrated circuit device, the circuitry that uses high-voltage transistors like the level shifter LS1 shown in FIG. 16 and the level shifter LS3 shown in FIG. 19 is manufactured through manufacturing processes separately from that of the circuitry using low-voltage transistors that withstand a voltage of about the supply voltage VDD. This complicates the manufacturing process and causes an increase in both the manufacturing period and the manufacturing costs. Further, the high-voltage transistors whose gate oxide film is thick require a greater layout area, and thus additionally causes an increase in the chip area.

To cope with such problems, it may be possible to dispense with the thick-film transistors used in the level shifter LS1, and to adopt the field relaxation circuit technique in structuring the level shifter with low-voltage transistors. FIG. 21 shows a level shifter LS10 that is structured with the field relaxation circuit technique.

As shown in FIG. 21, the level shifter LS10 includes PMOS transistors MP11, MP12, MP21, and MP22, NMOS transistors MN11, MN12, MN21, and MN22, an input terminal IN10, output terminal OUT10 and OUT10B, and an inverter circuit IV10.

The PMOS transistor MP11 is connected between the node N1 and a node N11. The gate of the PMOS transistor MP11 is connected to a node N12. The PMOS transistor MP12 is connected between the node N1 and the node N12. The gate of the PMOS transistor MP12 is connected to the node N11. The PMOS transistor MP21 is connected between the node N11 and the output terminal OUT10B. The PMOS transistor MP22 is connected between the node N12 and the output terminal OUT10. The gate of the PMOS transistor MP21 and that of the PMOS transistor MP22 are connected to a supply voltage terminal VDD.

The NMOS transistor MN11 is connected between a node N21 and a ground terminal GND. The gate of the NMOS transistor MN11 is connected to the input terminal IN10. The NMOS transistor MN12 is connected between a node N22 and the ground terminal GND. The gate of the NMOS transistor MN12 is connected to the output terminal of the inverter circuit IV10. The NMOS transistor MN21 is connected between the output terminal OUT10B and the node N21. The NMOS transistor MN22 is connected between the output terminal OUT10 and the node N22. The gate of the NMOS transistor MN21 and that of the NMOS transistor MN22 are connected to a supply voltage terminal VDD.

FIG. 22 is a table showing the relationship between the clock signal received at the input terminal IN10 and the potential of the output terminal OUT10 (and that of the inverted output terminal OUT10B) as well as the potential of each of the nodes of the level shifter LS10. Here, "Vtp" denotes the threshold voltage of the PMOS transistors, and "Vtn" denotes the threshold voltage of the NMOS transistors.

As can be seen in the table of FIG. 22, when the clock signal received at the input terminal IN10 is at low level (when "L" in the table), similarly to the level shifter LS1, the potentials of the output terminals OUT10 and OUT10B are the ground voltage GND and 2VDD, respectively. However, the potentials of respective nodes assume the values as shown in the table of FIG. 22. The potential difference between the gate and the drain of each transistor, or that between the gate and the source of each transistor, falls within the value of the supply voltage VDD. The same holds true for a case where the input signal received at the input terminal IN10 is at high level (when "H" in the table). By replacing the level shifter LS10 in which the field relaxation circuit technique is employed by the level shifter LS1 of the booster circuit 1, the transistors used in the booster circuit 1 can all be switched to the low-voltage transistors.

FIG. 23 shows the circuit structure of a level shifter LS30 of the booster circuit 2 that generates negative voltage, in which the field relaxation circuit technique is adopted in structuring the level shifter LS30, similarly to the booster circuit 1. FIG. 24 is a table showing the relationship between the clock signal received at the input terminal IN10 of the level shifter LS30 and the potential of the output terminal OUT10 (and that of the inverted output terminal OUT10B) as well as the potential of each of the nodes.

Here, for example in the case of the level shifter LS10, the high-potential supply voltage uses the potential of the node N1 shown in FIG. 14. Accordingly, in the initial state where the booster circuit 1 starts to operate, the potential of the node N1 is not boosted, and it is VDD rather than 2VDD. Accordingly, even when the clock signal CLK1 received at the input terminal IN10 is at high level, the PMOS transistor MP22 shown in FIG. 21 does not turn on, and the output potential from the output terminal OUT10 becomes irregular. This prevents the PMOS transistor MP1 shown in FIG. 14 from turning off. As a result, the booster circuit 1 cannot carry out a boost operation, failing to boost the output voltage VOUT to 2VDD. Accordingly, it has now been discovered that there is a problem that the level shifter structured using the field relaxation circuit technique cannot be used and, therefore, the booster circuit 1 cannot be structured with low-voltage transistors.

Further, in the case of the booster circuit 2 also, the low-potential supply voltage of the level shifter LS30 uses the potential of the node N1 shown in FIG. 18. Accordingly, in the initial state where the booster circuit 2 starts to operate, the potential of the node N1 is not negatively boosted, and it is the ground voltage GND rather than −VDD. Accordingly, even when the clock signal CLK1 received at the input terminal IN10 is at low level, the NMOS transistor MN22 shown in FIG. 23 does not turn on, and the output potential from the output terminal OUT10 becomes irregular. This prevents the NMOS transistor MN1 shown in FIG. 18 from turning off. As a result, the booster circuit 2 cannot carry out a negative boost operation, failing to boost the output voltage VOUT to −VDD. Accordingly, it has now been discovered that there is a problem that the level shifter structured using the field relaxation circuit technique cannot be used and, therefore, similarly to the booster circuit 1, the booster circuit 2 cannot be structured with low-voltage transistors.

A booster circuit that boosts a first supply voltage to one of a positive prescribed voltage and a negative prescribed voltage, comprising: a first transistor that is connected to a first node; a first capacitive element that has one end connected to the first node, and that is charged with a voltage of the first node when the first transistor is activated; and a first control signal generating circuit that provides a control terminal of the first transistor with a first control signal being in accordance with a first clock signal, wherein when the first transistor is de-activated, the first capacitive element boosts a voltage of the first node to one of a positive first voltage and a negative first voltage by a voltage being applied to other end of the first capacitive element, the voltage applied to the other end being at least ½ as great as the first supply voltage, and the first control signal generating circuit sets a voltage of the first control signal when the first transistor is de-activated to be the first voltage of the first node, and sets a voltage of the first control signal when the first transistor is activated to be a voltage, difference between the voltage and the first voltage being equal to or smaller than a value of the first supply voltage.

The booster circuit in accordance with the present invention causes the operation voltage of the control signal generating circuit to fall within a range from the second potential to the first supply voltage. Thus, even when the first node is not boosted in an initial state of the booster circuit, the control signal generating circuit does not output the first control signal of an irregular voltage. This makes it possible to structure the control signal generating circuit with transistors that withstand the voltage that falls within the value of the first supply voltage.

The booster circuit in accordance with the present invention can be structured using low-voltage transistors that withstand the voltage that falls within the value of the first supply voltage and, therefore, the circuit scale can be reduced and the manufacturing process can be simplified.

BRIEF DESCRIPTION OF THE DRAWINGS

The above and other exemplary aspects, advantages and features will be more apparent from the following description of certain exemplary embodiments taken in conjunction with the accompanying drawings, in which:

FIG. 6 is a table showing a relationship between input/output signals and the potential of each of the nodes of the level shifter LS101 in accordance with the first exemplary embodiment;

FIG. 7 is a table showing the relationship between input/output signals and the potential of each of the nodes of the level shifter LS103 in accordance with the first exemplary embodiment;

FIG. 12 is a table showing a relationship between input/output signals and the potential of each of the nodes of the level shifter LS201 in accordance with the second exemplary embodiment;

FIG. 13 is a table showing a relationship between input/output signals and the potential of each of the nodes of the level shifter LS203 in accordance with the second exemplary embodiment;

FIG. 17 is a table showing a relationship between input/output signals and the potential of each of the nodes of the conventional level shifter LS1;

FIG. 20 is a table showing a relationship between input/output signals and the potential of each of the nodes of the conventional level shifter LS3;

FIG. 22 is a table showing a relationship between input/output signals and the potential of each of the nodes of the conventional level shifter LS10;

FIG. 24 is a table showing a relationship between input/output signals and the potential of each of the nodes of the conventional level shifter LS30.

DETAILED DESCRIPTION OF THE EXEMPLARY EMBODIMENTS

First Exemplary Embodiment of the Present Invention

Specific exemplary embodiment to which the present invention is applied is explained in detail hereinafter with reference to the drawings. The present exemplary embodiment is an application of the present invention to a positive booster circuit in a semiconductor storage device such as flash memory.

Figure 1:
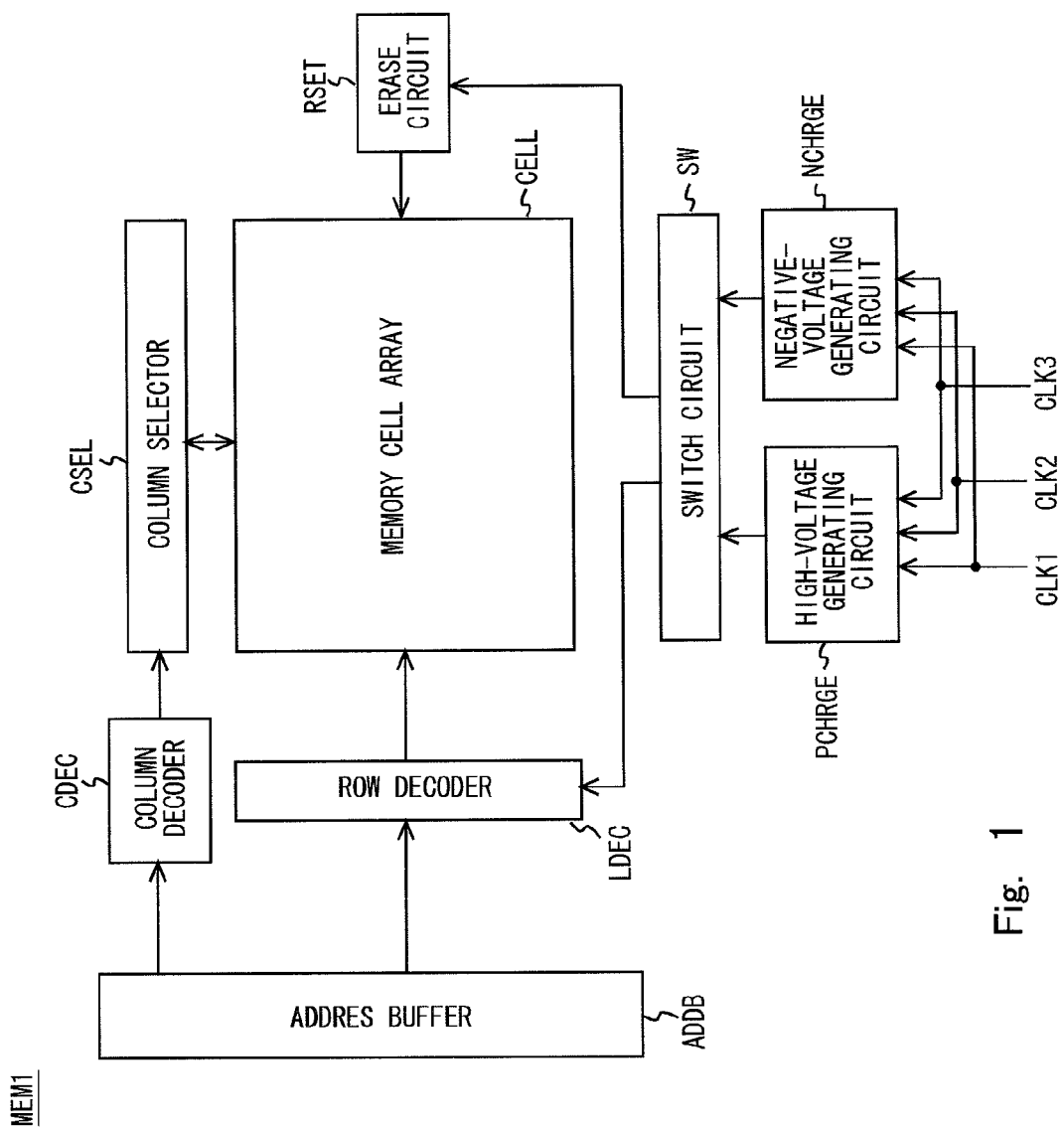
FIG. 1 is a block diagram of a semiconductor storage device in accordance with a first exemplary embodiment.

FIG. 1 is a block diagram of the structure of a semiconductor storage device MEM1 in accordance with a first exemplary embodiment. As shown in FIG. 1, the semiconductor storage device MEM1 includes a memory cell array CELL, an address buffer ADDB, a row decoder LDEC, a column decoder CDEC, a column selector CSEL, an erase circuit RSET, a switch circuit SW, a high-voltage generating circuit PCHRGE, and a negative-voltage generating circuit NCHRGE.

The memory cell array CELL is a matrix of storage elements. The storage elements are connected to bit lines and word lines. The row decoder LDEC selects one of the word lines in accordance with row address data being sent from the address buffer ADDB. The column decoder CDEC selects one of the bit lines in accordance with column address data being sent from the address buffer ADDB. The column selector CSEL connects the bit line selected by the column decoder CDEC to a data line.

The high-voltage generating circuit PCHRGE generates a voltage VPP that is higher than a supply voltage VDD. The negative-voltage generating circuit NCHRGE generates a negative voltage VKK that is lower than a ground voltage GND. The switch circuit SW supplies the voltage generated by the high-voltage generating circuit PCHRGE or the negative-voltage generating circuit NCHRGE to the row decoder LDEC or the erase circuit RSET, as necessary.

For example, the high-potential voltage VPP generated by the high-voltage generating circuit PCHRGE is supplied to a word line driver of the row decoder LDEC, and used for a high-level word signal. On the other hand, a negative-potential voltage VKK generated by the negative-voltage generating circuit NCHRGE is supplied to a word line driver of the row decoder LDEC, and used for a low-level word signal.

In a case where the semiconductor storage device MEM1 is flash memory, the erase circuit RSET has a function of erasing data stored in the storage elements of the memory cell array CELL. In such a situation of data erasure, the high-potential voltage VPP and the negative voltage VKK respectively generated by the high-voltage generating circuit PCHRGE and the negative-voltage generating circuit NCHRGE are used. The high-potential voltage VPP applied to one side of a floating gate of the storage element and the negative voltage VKK applied to the other side thereof execute a task of releasing the charges accumulated in the floating gate.

Figure 2:
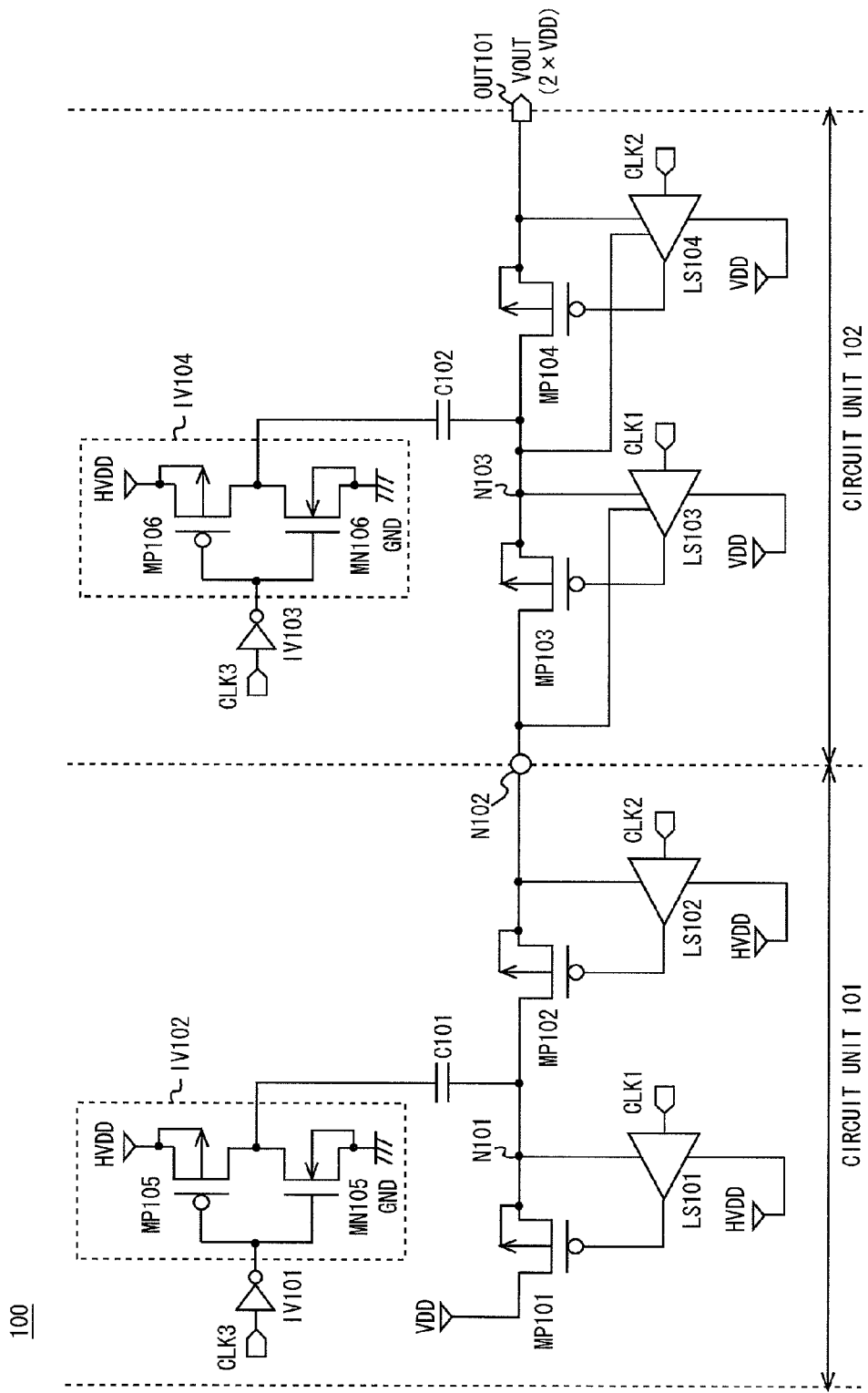
FIG. 2 shows a circuit structure of a positive-potential booster circuit 100 in accordance with the first exemplary embodiment.

FIG. 2 shows one exemplary structure of a booster circuit 100 included in the high-voltage generating circuit PCHRGE in accordance with the first exemplary embodiment. As shown in FIG. 2, the booster circuit 100 includes PMOS transistors MP101, MP102, MP103, and MP104, level shifters LS101, LS102, LS103, and LS104, capacitors C101 and C102, and inverter circuits IV101, IV102, IV103, and IV104.

One end being source/drain of the PMOS transistor MP101 (a first transistor) is connected to a supply voltage terminal VDD (a first power supply terminal) that supplies a supply voltage VDD (a first supply voltage), and the other end being source/drain of the PMOS transistor MP101 is connected to a node N101 (a first node). At the gate of the PMOS transistor MP101, an output signal of the level shifter LS101 is received. One end being source/drain of the PMOS transistor MP102 (a second transistor) is connected to the node N101, and the other end being source/drain of the PMOS transistor MP102 is connected to a node N102 (second node). At the gate of the PMOS transistor MP102, an output signal of the level shifter LS102 is received. Note that, for the sake of convenience, the reference character "VDD" not only denotes the name of supply voltage terminal, but also denotes the supply voltage VDD. Similarly, the reference character "GND" not only denotes the name of ground terminal, but also denotes the ground voltage GND.

The level shifter LS101 (a first control signal generating circuit) receives a clock signal CLK1 and provides an output signal (first control signal) to the gate of the PMOS transistor MP101. The level shifter LS101 is supplied with a high-potential supply voltage from the node N101 and with a low-potential supply voltage from an HVDD voltage terminal. Here, the HVDD voltage terminal supplies a voltage ½ as great as the supply voltage VDD (hereinafter referred to as the ½ VDD). Note that the ½ VDD voltage from the HVDD voltage terminal may be generated by a potential obtained by dividing the supply voltage VDD with resisters possessing the same resistance value.

The level shifter LS102 (a second control signal generating circuit) receives a clock signal CLK2 and provides an output signal (second control signal) to the gate of the PMOS transistor MP102. The level shifter LS102 is supplied with a high-potential supply voltage from the node N102 and with a low-potential supply voltage from an HVDD voltage terminal.

The inverter circuit IV101 receives a clock signal CLK3 and provides an inverted signal thereof to the input of the inverter circuit IV102. As shown in FIG. 2, the inverter circuit IV102 includes a PMOS transistor MP105 and an NMOS transistor MN105. The PMOS transistors MP105 and the NMOS transistor MN105 are connected in series between an HVDD power supply terminal and a ground terminal GND. A common node of the PMOS transistor MP105 and the NMOS transistor MN105 serves as the output terminal of the inverter circuit IV102. At the gate of the PMOS transistor MP105 and the NMOS transistor MN105, an output signal of the inverter circuit IV101 is received. Accordingly, the inverter circuit IV102 produces, in accordance with the clock signal CLK3, an output signal whose high-level potential is the ½ VDD and whose low-level potential is the ground voltage GND.

One end of the capacitor C101 (a first capacitive element) is connected to the output terminal of the inverter circuit IV102, and the other end thereof is connected to the node N101.

One end being source/drain of the PMOS transistor MP103 (ninth transistor) is connected to the node N102, and the other end being source/drain thereof is connected to a node N103 (a seventh node). At the gate of the PMOS transistor MP103, an output signal of the level shifter LS103 is received. One end being source/drain of the PMOS transistor MP104 (a tenth transistor) is connected to the node N103, and the other end being source/drain thereof is connected to an output terminal OUT101 (an eighth node). At the gate of the PMOS transistor MP104, an output signal of the level shifter LS104 is received.

The level shifter LS103 (a third control signal generating circuit) receives the clock signal CLK1 and provides an output signal (a third control signal) to the gate of the PMOS transistor MP103. While the structure of the level shifter LS103 will be detailed later, it is noted herein that a high-potential supply voltage is supplied from the nodes N102 and N103 and a low-potential supply voltage is supplied from a supply voltage terminal VDD. The level shifter LS104 (a fourth control signal generating circuit) receives the clock signal CLK2 and provides an output signal (a fourth control signal) to the gate of the PMOS transistor MP104. While the structure of the level shifter LS104 will be detailed later, it is noted herein that a high-potential supply voltage is supplied from the node N103 and the output terminal OUT101 and a low-potential supply voltage is supplied from a supply voltage terminal VDD.

The inverter circuit IV103 receives the clock signal CLK3 and provides an inverted signal thereof to the input of the inverter circuit IV104. As shown in FIG. 2, the inverter circuit IV104 includes a PMOS transistor MP106 and an NMOS transistor MN106. The PMOS transistor MP106 and the NMOS transistor MN106 are connected in series between an HVDD power supply terminal and a ground terminal GND. A common node of the PMOS transistor MP106 and the NMOS transistor MN106 serves as the output terminal of the inverter circuit IV104. At the gate of the PMOS transistor MP106 and the NMOS transistor MN106, an output signal of the inverter circuit IV103 is received. Accordingly, the inverter circuit IV104 produces, in accordance with the clock signal CLK3, an output signal whose high-level potential is the ½ VDD and whose low-level potential is the ground voltage GND.

One end of the capacitor C102 (second capacitive element) is connected to the output terminal of the inverter circuit IV104, and the other end thereof is connected to the node N103.

Figure 3:
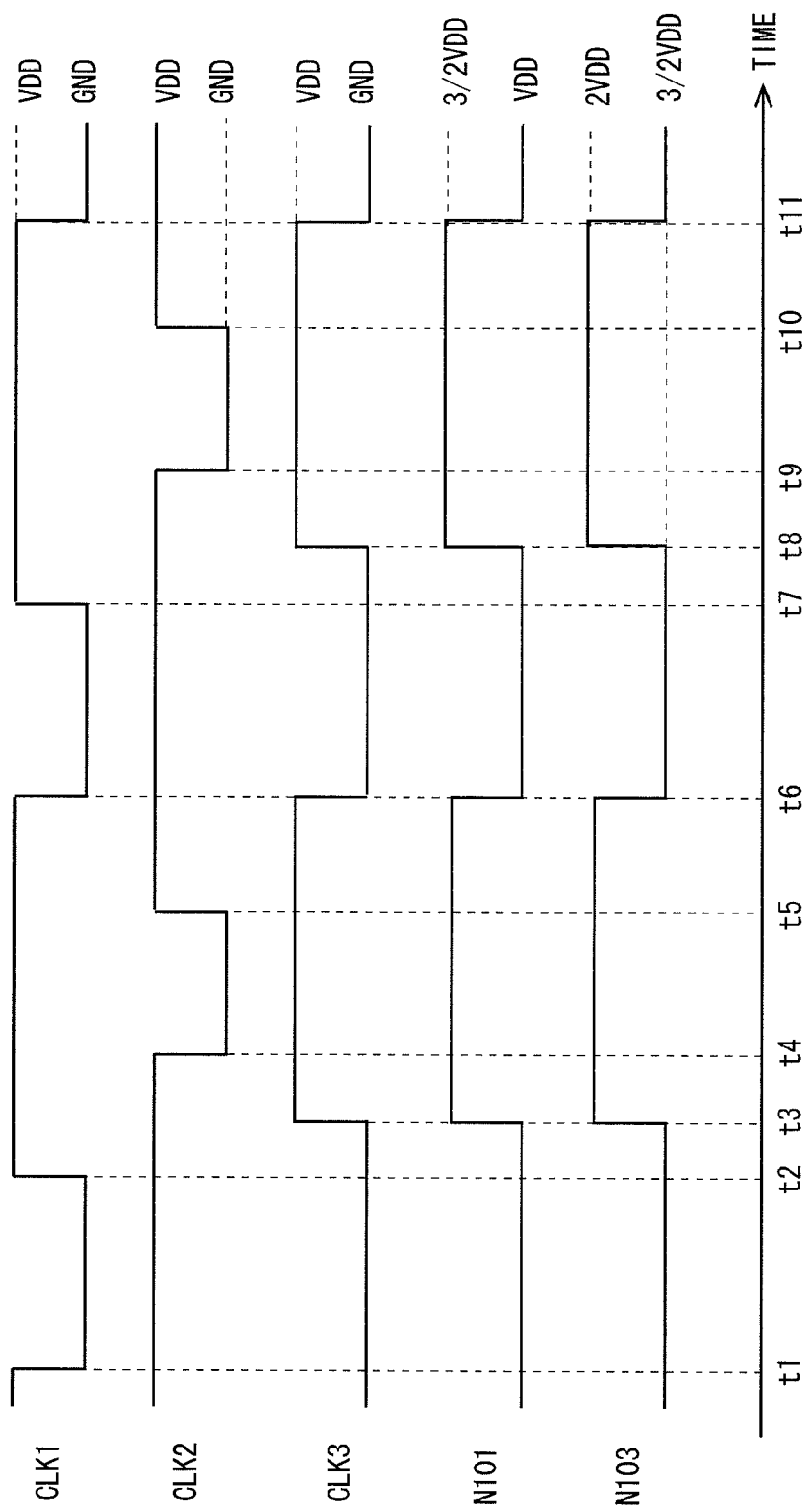
FIG. 3 is an operation timing chart of the booster circuit 100 in accordance with the first exemplary embodiment.

It is noted that the PMOS transistors and the NMOS transistors are low-voltage transistors whose gate oxide film withstands the voltage equal to or smaller than the supply voltage VDD. It is also noted that the threshold voltage Vtp of the PMOS transistors and threshold voltage Vtn of the NMOS transistors are both equal to or smaller than ½ VDD. FIG. 3 is a timing chart for describing the operation of the booster circuit 100. Here, explanations are separately given of the operation of a circuit unit 101 and of a circuit unit 102 shown in FIG. 2. The operation of the circuit unit 101 is explained with reference to time points from t1 to t6, and the operation of the circuit unit 102 is explained with reference to time points from t6 to t11.

First, as shown in FIG. 3, in connection with the operation of the circuit unit 101, during the period from time points t1 to t2, the clock signal CLK1 is at low level and the PMOS transistor MP101 is in ON state. Accordingly, the supply voltage terminal VDD and the node N101 are electrically connected to each other, causing the potential of the node N101 to be the supply voltage VDD. On the other hand, during this period, the clock signal CLK3 is at low level, and the potential output from the inverter circuit IV102 is the ground voltage GND. Therefore, the potential of one end of the capacitor C101 becomes the ground voltage GND and the capacitor C101 is charged by the potential difference VDD.

At time point t2, the clock signal CLK1 rises to high level. Accordingly, the supply voltage terminal VDD and the node N101 are electrically disconnected from each other. As the PMOS transistor MP102 is also in OFF state due to the clock signal CLK2, the node N101 becomes high impedance. However, since the capacitor C101 is charged, the potential of the node N101 is maintained at the VDD.

At time point t3, the clock signal CLK3 rises to high level. Accordingly, the potential output from the inverter circuit IV102 becomes the ½ VDD. Hence, a potential of ½ VDD is applied to one end of the capacitor C101, and the potential of the other end of the capacitor C101 is boosted by the ½ VDD. Hence, the potential of the node N101 becomes ³⁄₂ VDD (=VDD+½ VDD).

During the period from time points t4 to t5, the clock signal CLK2 is at low level and the PMOS transistor MP102 is in ON state. Accordingly, the node N101 and the node N102 are electrically connected to each other, and the potential of the node N102 becomes ³⁄₂ VDD.

At time point t5, the clock signal CLK2 rises to high level. Accordingly, the node N101 and the node N102 are electrically disconnected from each other.

Next, as shown in FIG. 3, in connection with the operation of the circuit unit 102, during the period from time points t6 to t7, the clock signal CLK1 is at low level and the PMOS transistor MP103 is in ON state. Accordingly, the node N102 and the node N103 are electrically connected to each other, and the potential of the node N103 becomes ³⁄₂ VDD. On the other hand, during this period, the clock signal CLK3 is at low level, and the potential output from the inverter circuit IV104 is the ground voltage GND. Therefore, the potential of one end of the capacitor C102 becomes the ground voltage GND and the capacitor C102 is charged by the potential difference ³⁄₂ VDD.

At time point t7, the clock signal CLK1 rises to high level. Accordingly, the node N102 and the node N103 are electrically disconnected from each other. As the PMOS transistor MP104 is also in OFF state due to the clock signal CLK2, the node N103 becomes high impedance. However, since the capacitor C102 is charged, the potential of the node N103 is maintained at the ³⁄₂ VDD.

At time point t8, the clock signal CLK3 rises to high level. Accordingly, the potential output from the inverter circuit IV102 becomes the ½ VDD. Hence, a potential of the ½ VDD is applied to one end of the capacitor C102, and the potential of the other end of the capacitor C102 is boosted by the ½ VDD. Hence, the potential of the node N103 becomes 2VDD (=³⁄₂ VDD+½ VDD).

During the period from time points from t9 to t10, the clock signal CLK2 is at low level, and the PMOS transistor MP104 is in ON state. Accordingly, the node N103 and the output terminal OUT101 are electrically connected to each other, and the potential of the output terminal becomes 2VDD.

At time point t11, the clock signal CLK2 rises to high level. Accordingly, the node N103 and the output terminal OUT101 are electrically disconnected from each other. Here, during the periods from time points t3 to t6 and from t8 to t11, the potential of the node N101 and that of the node N103 are respectively greater than the supply voltage VDD and the potential of the node N102, i.e., ³⁄₂VDD. Therefore, in order to prevent backflow of current into the supply voltage terminal VDD and the node N102, it is necessary to turn off the PMOS transistors MP101 and MP103 during the periods from time points t2 to t6 and from t7 to t11. To this end, the level shifters LS101 and LS102 structured as shown in FIG. 4 are used in the circuit unit 101, and the level shifters LS103 and LS104 structured as shown in FIG. 5 are used in the circuit unit 102.

Figure 4:
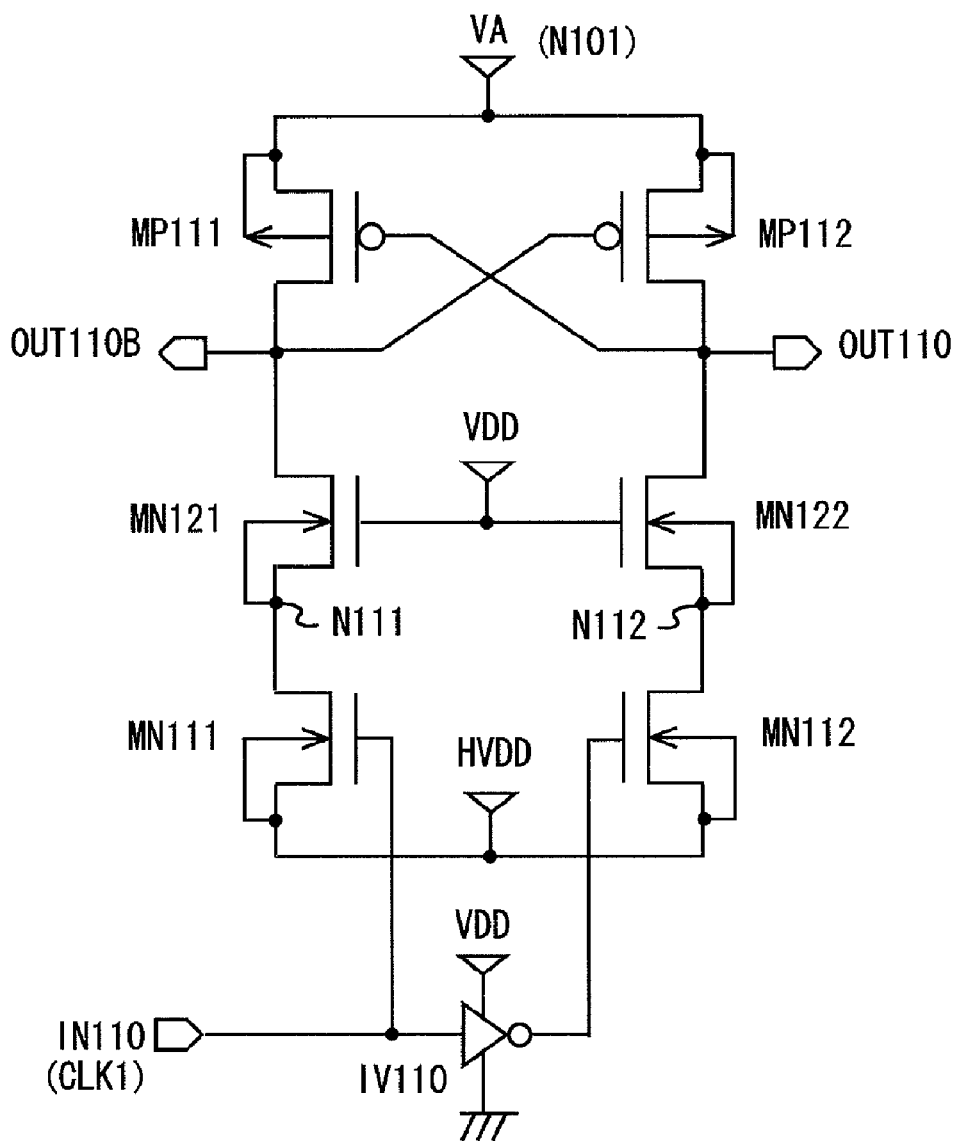
FIG. 4 shows a circuit structure of a level shifter LS101 in accordance with the first exemplary embodiment.
Figure 5:
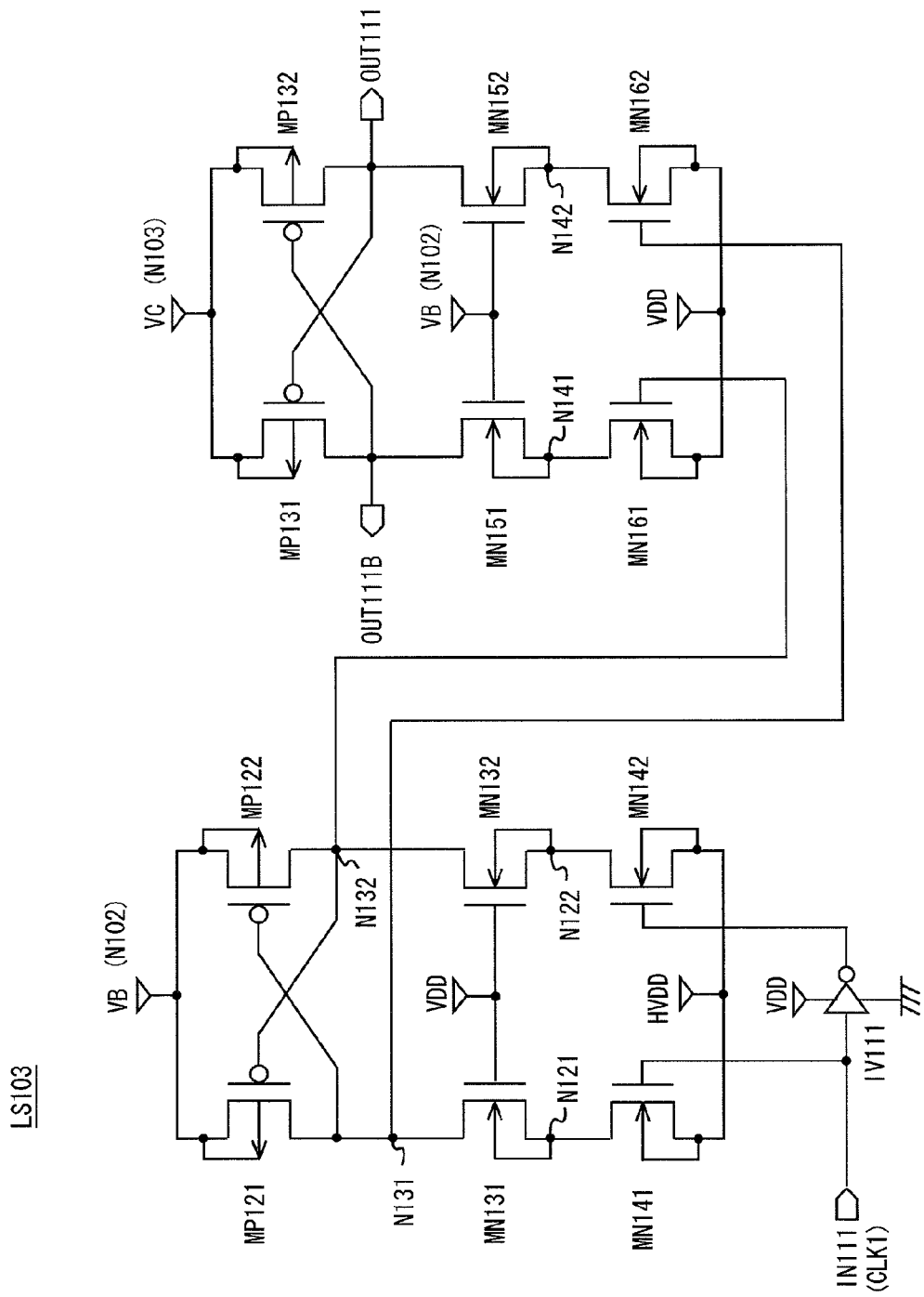
FIG. 5 shows a circuit structure of a level shifter LS103 in accordance with the first exemplary embodiment.

FIG. 4 shows the structure of the level shifter LS101. Here, as the level shifter LS102 is substantially similarly structured as the level shifter LS101, the explanation thereof is omitted, unless otherwise noted. As shown in FIG. 4, the level shifter LS101 includes PMOS transistors MP111 and MP112, NMOS transistors MN111, MN112, MN121, and MN122, an input terminal IN110, output terminals OUT110 and OUT110B, and an inverter circuit IV110. At the input terminal IN110, the clock signal CLK1 is received. An output signal from the output terminal OUT110 is provided to the gate of the PMOS transistor MP101 shown in FIG. 2.

Note that, in connection with the level shifter LS102, the clock signal CLK2 is received at the input terminal IN110. An output signal from the output terminal OUT110 is provided to the gate of the PMOS transistor MP102 shown in FIG. 2.

The source of the PMOS transistor MP111 (a third transistor) is connected to a power supply terminal VA (first voltage supply terminal), the drain thereof being connected to the output terminal OUT110B (a third node), and the gate thereof being connected to the output terminal OUT110 (a fourth node). The source of the PMOS transistor MP112 (fourth transistor) is connected to the power supply terminal VA, the drain thereof being connected to the output terminal OUT110, and the gate thereof being connected to the output terminal OUT110B. Here, the power supply terminal VA is connected to the node N101 shown in FIG. 2. Note that, in connection with the level shifter LS102, the power supply terminal VA is connected to the node N102 shown in FIG. 2.

The drain of the NMOS transistor MN111 (a seventh transistor) is connected to a node N111 (a fifth node), the source thereof being connected to an HVDD terminal (third voltage supply terminal), and the gate thereof being connected to the input terminal IN110. The drain of the NMOS transistor MN112 (an eighth transistor) is connected to a node N112 (a sixth node), the source thereof being connected to the HVDD terminal, and the gate thereof being connected to the output terminal of the inverter circuit IV110. The drain of the NMOS transistor MN121 (a fifth transistor) is connected to the output terminal OUT110B, the source thereof being connected to the node N111, and the gate thereof being connected to a supply voltage terminal VDD (a second voltage supply terminal). The drain of the NMOS transistor MN122 (a sixth transistor) is connected to the output terminal OUT110, the source thereof being connected to the node N112, and the gate thereof being connected to the supply voltage terminal VDD.

The input terminal of the inverter circuit IV110 is connected to the input terminal IN110, and the output terminal thereof is connected to the gate of the NMOS transistor MN112.

Next, FIG. 5 shows the structure of the level shifter LS103. Here, as the level shifter LS104 is substantially similarly structured as the level shifter LS103, the explanation thereof is omitted, unless otherwise noted. As shown in FIG. 5, the level shifter LS103 includes PMOS transistors MP121, MP122, MP131, and MP132, NMOS transistors MN131, MN132, MN141, MN142, MN151, MN152, MN161, and MN162, an input terminal IN111, output terminals OUT111 and OUT111B, and an inverter circuit IV111. At the input terminal IN111, the clock signal CLK1 is received. An output signal from the output terminal OUT111 is provided to the gate of the PMOS transistor MP103 shown in FIG. 2.

Note that, in connection with the level shifter LS104, the clock signal CLK2 is received at the input terminal IN111. An output signal from the output terminal OUT111 is provided to the gate of the PMOS transistor MP104 shown in FIG. 2.

The source of the PMOS transistor MP121 (an eleventh transistor) is connected to a power supply terminal VB (a fourth voltage supply terminal), the drain thereof being connected to a node N131 (a ninth node), and the gate thereof being connected to a node N132 (a tenth node). The source of the PMOS transistor MP122 (a twelfth transistor) is connected to the power supply terminal VB, the drain thereof being connected to the node N132, and the gate thereof being connected to the node N131. Here, the power supply terminal VB is connected to the node N102 shown in FIG. 2. Note that, in connection with the level shifter LS104, the power supply terminal VB is connected to the node N103 shown in FIG. 2.

The drain of the NMOS transistor MN141 (a seventeenth transistor) is connected to a node N121 (an eleventh node), the source thereof being connected to an HVDD terminal (a sixth voltage supply terminal), and the gate thereof being connected to the input terminal IN111. The drain of the NMOS transistor MN142 (an eighteenth transistor) is connected to a node N122 (a twelfth node), the source thereof being connected to the HVDD terminal, and the gate thereof being connected to the output terminal of the inverter circuit IV111. The drain of the NMOS transistor MN131 (a fifteenth transistor) is connected to the node N131, the source thereof being connected to the node N121, and the gate thereof being connected to a supply voltage terminal VDD (a fifth voltage supply terminal). The drain of the NMOS transistor MN132 (a sixteenth transistor) is connected to the node N132, the source thereof being connected to the node N122, and the gate thereof being connected to the supply voltage terminal VDD.

The input terminal of the inverter circuit IV111 is connected to the input terminal IN111, and the output terminal thereof is connected to the gate of the NMOS transistor MN142.

The source of the PMOS transistor MP131 (a thirteenth transistor) is connected to a power supply terminal VC (a seventh voltage supply terminal), the drain thereof being connected to the output terminal OUT111B (a thirteenth node), and the gate thereof being connected to the output terminal OUT111 (a fourteenth node). The source of the PMOS transistor MP132 (a fourteenth transistor) is connected to the power supply terminal VC, the drain thereof being connected to the output terminal OUT111, and the gate thereof being connected to the output terminal OUT111B. Here, the power supply terminal VC is connected to the node N103 shown in FIG. 2. Note that, in connection with the level shifter LS104, the power supply terminal VC is connected to the output terminal OUT101 shown in FIG. 2.

The drain of the NMOS transistor MN161 (a twenty-first transistor) is connected to a node N141 (fifteenth node), the source thereof being connected to a supply voltage terminal VDD, and the gate thereof being connected to the node N132. The drain of the NMOS transistor MN162 (a twenty-second transistor) is connected to a node N142 (a sixteenth node), the source thereof being connected to the supply voltage terminal VDD, and the gate thereof being connected to the node N131. The drain of the NMOS transistor MN151 (a nineteenth transistor) is connected to the output terminal OUT111B, the source thereof being connected to the node N141, and the gate thereof being connected to a power supply terminal VB. The drain of the NMOS transistor MN152 (a twentieth transistor) is connected to the output terminal OUT111, the source thereof being connected to the node N142, and the gate thereof being connected to the power supply terminal VB.

It is noted that the all of the PMOS transistors and the NMOS transistors structuring the level shifters LS101, LS102, LS103, and LS104 described above are low-voltage transistors whose gate oxide film withstands the voltage equal to or smaller than the supply voltage VDD. The threshold voltage Vtp of the PMOS transistors and the threshold voltage Vtn of the NMOS transistors are both equal to or smaller than ½ VDD. Further, as can be seen from FIG. 5, it can also be construed that the level shifter LS103 (and LS104) is structured with two level shifters connected to each other at the nodes N131 and N132. As to such two level shifters also, the potential difference between the high-potential supply voltage and the low-potential supply voltage falls within the value of the VDD.

Here, an explanation is given of the circuit unit 101, focusing on the operation of the level shifter LS101. It is to be noted that the operation of the level shifter LS102 is similar to that of the level shifter LS101 except that the input clock signal is CLK2, and therefore an explanation thereof is omitted. FIG. 6 is a table showing the relationship between the clock signal CLK1 being provided to the input terminal IN110 of the level shifter LS101 and the potential of each of the output terminal OUT110 (and the inverted output terminal OUT110B), the nodes N111 and N112. Here, "Vtn" denotes the threshold voltage of the NMOS transistors.

As shown in the table of FIG. 6, when the clock signal CLK1 provided to the input terminal IN110 is at low level (i.e., at the ground voltage GND), the potential of the output terminal OUT110 and that of the output terminal OUT110B are ½ VDD and ³⁄₂ VDD, respectively. The potential of the node N111 and that of the node N112 are VDD–Vtn and ½ VDD, respectively.

To the contrary, when the clock signal CLK1 provided to the input terminal IN110 is at high level (i.e., at the supply voltage VDD), the potential of the output terminal OUT110 and that of the output terminal OUT110B are ³⁄₂ VDD and ½ VDD, respectively. The potential of the node N111 and that of the node N112 are ½ VDD and VDD–Vtn, respectively.

The level shifter LS102 operates similarly in accordance with the clock signal CLK2. Thus, the potential difference between the gate and the drain or between the gate and the source of the transistors included in the level shifter LS101 and LS102 can be set to fall within the value of the supply voltage VDD.

As explained in the foregoing, the level shifter LS101 outputs ½ VDD when the clock signal CLK1 is at low level, and outputs ³⁄₂ VDD when the clock signal CLK1 is at high level. In accordance with the output of the level shifter LS101, the ON/OFF operation of the PMOS transistor MP101 shown in FIG. 2 is controlled. The level shifter LS102 similarly outputs ½ VDD when the clock signal CLK2 is at low level, and outputs ½ VDD when the clock signal CLK2 is at high level. In accordance with the output of the level shifter LS102, the ON/OFF operation of the PMOS transistor MP102 shown in FIG. 2 is controlled. Thus, the potential difference between the gate and the drain or between the gate and the source of each of the PMOS transistors MP101 and MP102 can be set to fall within the value of the supply voltage VDD. In this manner, as every transistor used in the circuit unit 101, a low-voltage transistor can be adopted.

Now, consideration is further given to the initial state of the booster circuit 100. In the initial state of the booster circuit 100, the capacitor C101 is not charged, and the node N101 is not boosted even when the clock signal CLK1 is at high level. Accordingly, the potential of the node N101 is VDD, rather than ½ VDD. Hence, the potential of the power supply terminal VA, which is a high-potential supply voltage of the level shifter LS101, is also VDD.

Figure 21:
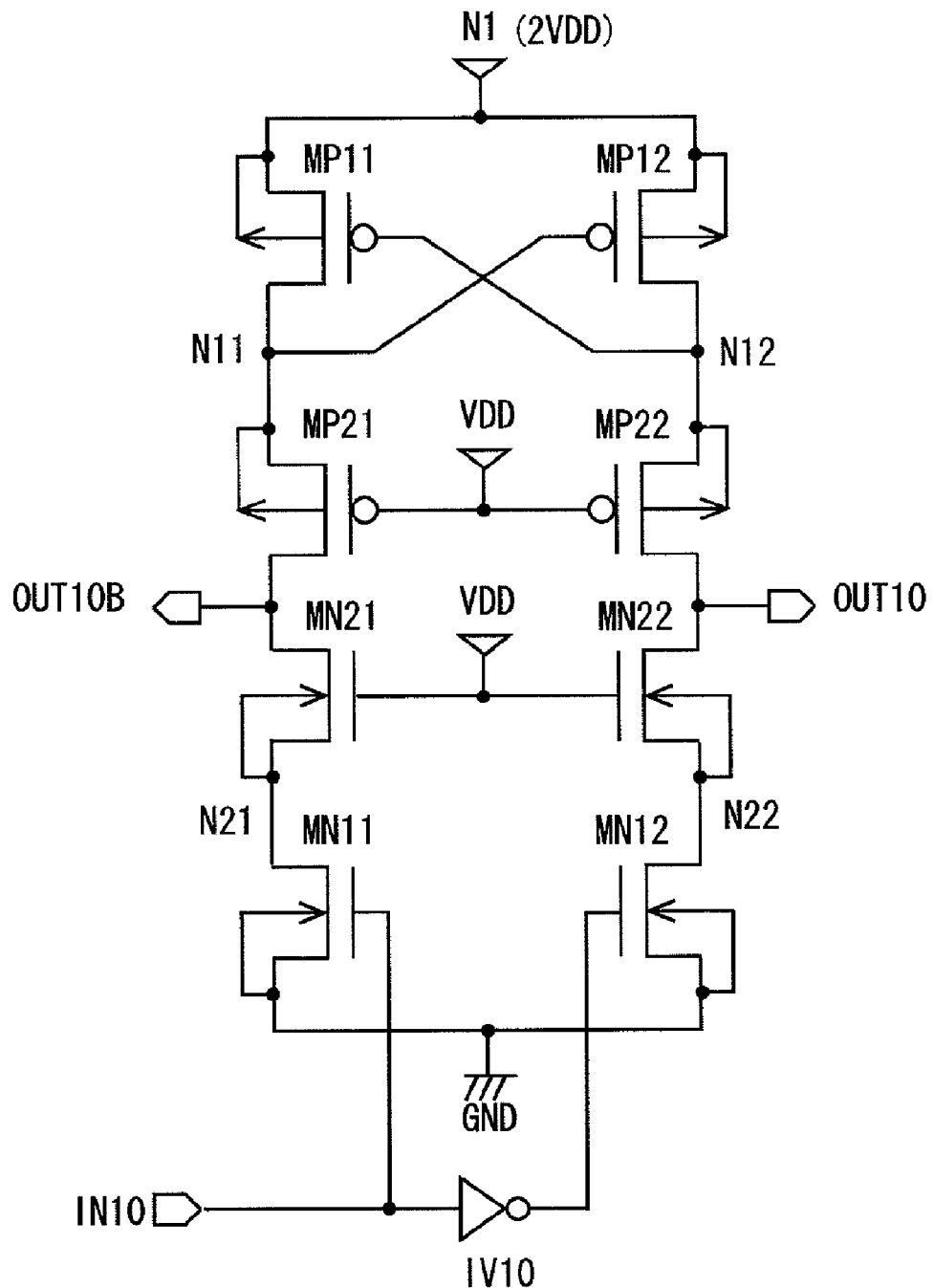
FIG. 21 is a circuit structure of a conventional level shifter LS10.

Turning now to the conventional level shifter LS10 shown in FIG. 21 in which the field relaxation circuit technique is employed, when the high-potential supply voltage is VDD, the PMOS transistor MP22 or MP21 does not turn on, resulting in an irregular potential of the output terminal OUT10. To the contrary, with the level shifter LS101 in accordance with the first exemplary embodiment, even when the potential of the power supply terminal VA is VDD, the potential difference between the source and the gate of the PMOS transistor MP112 or MP111 can be set to ½ causing the PMOS transistor MP112 or MP111 to turn on. Hence, the potential of the output terminal OUT110 does not become irregular, and the level shifter LS101 correctly operates even in the initial state. Thus, it becomes possible to surely turn off the PMOS transistor MP101, and the correct operation of the circuit unit 101 can be achieved.

Next, an explanation is given of the circuit unit 102, focusing on the operation of the level shifter LS103. It is to be noted that the operation of the level shifter LS104 is similar to that of the level shifter LS103 except that the input clock signal is CLK2 and therefore an explanation thereof is omitted. FIG. 7 is a table showing the relationship between the clock signal CLK1 being provided to the input terminal IN111 of the level shifter LS103 and the potential of each of the output terminal OUT111 (and the inverted output terminal OUT111B), the nodes N121, N122, N131, N132, N141, and N142.

As shown in the table of FIG. 7, when the clock signal CLK1 provided to the input terminal IN111 is at low level (i.e., at the ground voltage GND), the potential of the output terminal OUT111 and that of the output terminal OUT111B are VDD and 2VDD, respectively. The potential of the node N121 and that of the node N122 are VDD−Vtn and ½ VDD, respectively. The potential of the node N131 and that of the node N132 are ½ VDD and ½ VDD, respectively. The potential of the node N141 and that of the node N142 are ½ VDD−Vtn and VDD, respectively.

To the contrary, when the clock signal CLK1 provided to the input terminal IN111 is at high level (i.e., at the supply voltage VDD), the potential of the output terminal OUT111 and that of the output terminal OUT111B are 2VDD and VDD, respectively. The potential of the node N121 and that of the node N122 are ½ VDD and VDD−Vtn, respectively. The potential of the node N131 and that of the node N132 are ½ VDD and ½ VDD, respectively. The potential of the node N141 and that of the node N142 are VDD and ½ VDD−Vtn, respectively.

The level shifter LS 104 operates similarly in accordance with the clock signal CLK2. Thus, the potential difference between the gate and the drain or between the gate and the source of the transistors included in the level shifter LS103 and LS104 can be set to fall within the value of the supply voltage VDD.

As explained in the foregoing, the level shifter LS103 outputs ½ VDD when the clock signal CLK1 is at low level, and outputs 2VDD when the clock signal CLK1 is at high level. In accordance with the output of the level shifter LS103, the ON/OFF operation of the PMOS transistor MP103 shown in FIG. 2 is controlled. The level shifter LS104 similarly outputs ½ VDD when the clock signal CLK2 is at low level, and outputs 2VDD when the clock signal CLK2 is at high level. In accordance with the output of the level shifter LS104, the ON/OFF operation of the PMOS transistor MP104 shown in FIG. 2 is controlled. Thus, the potential difference between the gate and the drain or between the gate and the source of each of the PMOS transistors MP103 and MP104 can be set to fall within the value of the supply voltage VDD. In this manner, as every transistor used in the circuit unit 102, a low-voltage transistor can be adopted.

As in the foregoing, with the booster circuit 100, even when all the transistors used therefor are low-voltage transistors, the output voltage VOUT as great as 2×VDD can be obtained. With the conventional level shifter shown in FIG. 21 in which the field relaxation circuit technique is employed, since the level shifter outputs an irregular potential in the initial state where the operation is started, the boosting operation cannot be carried out. To the contrary, the level shifter LS101 of the booster circuit 100 in accordance with the first exemplary embodiment does not output an irregular voltage even in the initial state where the operation is started. Accordingly, the booster circuit 100 can correctly start the boosting operation.

Second Exemplary Embodiment of the Present Invention

Specific second exemplary embodiment to which the present invention is applied is explained in detail hereinafter with reference to the drawings. The second exemplary embodiment is an application of the present invention to a negative booster circuit in a semiconductor storage device such as flash memory. That is, the present invention is applied to a booster circuit included in the negative-voltage generating circuit NCHRGE shown in FIG. 1.

Figure 8:
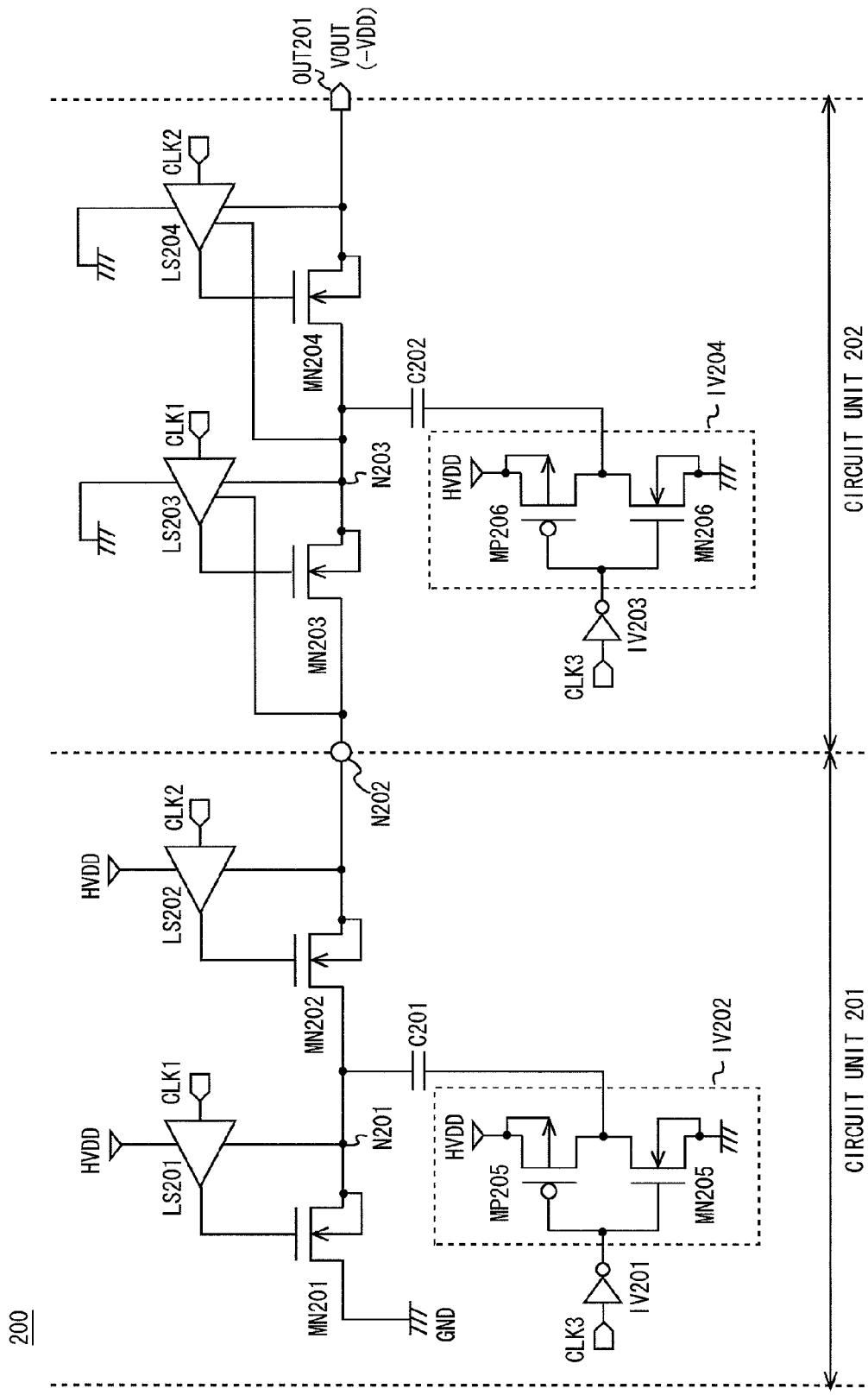
FIG. 8 shows a circuit structure of a negative-potential booster circuit 200 in accordance with a second exemplary embodiment.

FIG. 8 shows one exemplary structure of a booster circuit 200 included in the negative-voltage generating circuit NCHRGE in accordance with the second exemplary embodiment.

As shown in FIG. 8, the booster circuit 200 includes NMOS transistors MN201, MN202, MN203, and MN204, level shifters LS201, LS202, LS203, and LS204, capacitors C201 and C202, and inverter circuits IV201, IV202, IV203, and IV204.

One end being source/drain of the NMOS transistor MN201 (a first transistor) is connected to a ground terminal GND (a second power supply terminal) that supplies a ground voltage GND, and the other end being source/drain of the NMOS transistor MN201 is connected to a node N201 (a first node). At the gate of the NMOS transistor MN201, an output signal of the level shifter LS201 is received. One end being source/drain of the NMOS transistor MN202 (a second transistor) is connected to the node N201, and the other end being source/drain of the NMOS transistor MN202 is connected to a node N202. At the gate of the NMOS transistor MN202 (a second node), an output signal of the level shifter LS202 is received.

The level shifter LS201 (a first control signal generating circuit) receives a clock signal CLK1 and provides an output signal (a first control signal) to the gate of the NMOS transistor MN201. The level shifter LS201 is supplied with a high-potential supply voltage from an HVDD terminal and with a low-potential supply voltage from the node N201.

The level shifter LS202 (the second control signal generating circuit) receives a clock signal CLK2 and provides an output signal (a second control signal) to the gate of the NMOS transistor MN202. The level shifter LS202 is supplied with a high-potential supply voltage from an HVDD terminal and with a low-potential supply voltage from the node N202.

The inverter circuit IV201 receives a clock signal CLK3 and provides an inverted signal thereof to the input of the inverter circuit IV202. As shown in FIG. 8, the inverter circuit IV202 includes a PMOS transistor MP205 and an NMOS transistor MN205. The PMOS transistor MP205 and the NMOS transistor MN205 are connected in series between an HVDD power supply terminal and a ground terminal GND. A common node of the PMOS transistor MP205 and the NMOS transistor MN205 serves as the output terminal of the inverter circuit IV202. At the gate of the PMOS transistor MP205 and the NMOS transistor MN205, an output signal of the inverter circuit IV201 is received. Accordingly, the inverter circuit IV202 produces, in accordance with the clock signal CLK3, an output signal whose high-level potential is ½ VDD and whose low-level potential is the ground voltage GND.

One end of the capacitor C201 (a second capacitive element) is connected to the output terminal of the inverter circuit IV202, and the other end thereof is connected to the node N201.

One end being source/drain of the NMOS transistor MN203 (a seventh transistor) is connected to the node N202, and the other end being source/drain thereof is connected to a node N203 (a fifth node). At the gate of the NMOS transistor MN203, an output signal of the level shifter LS203 is received. One end being source/drain of the NMOS transistor MN204 (an eighth transistor) is connected to the node N203, and the other end being source/drain thereof is connected to an output terminal OUT201 (a sixth node). At the gate of the NMOS transistor MN204, an output signal of the level shifter LS204 is received.

The level shifter LS203 receives the clock signal CLK1 and provides an output signal to the gate of the NMOS transistor MN203. While the structure of the level shifter LS203 will be detailed later, it is noted herein that a high-potential supply voltage is supplied from a ground terminal GND, and a low-potential supply voltage is supplied from the nodes N202 and N203. The level shifter LS204 receives the clock signal CLK2, and provides an output signal to the gate of the NMOS transistor MN204. While the structure of the level shifter LS204 will be detailed later, it is noted herein that a high-potential supply voltage is supplied from a ground terminal GND, and a low-potential supply voltage is supplied from the node N203 and the output terminal OUT201.

The inverter circuit IV203 receives the clock signal CLK3 and provides an inverted signal thereof to the input of the inverter circuit IV204. The inverter circuit IV204 includes a PMOS transistor MP206 and an NMOS transistor MN206. As shown in FIG. 8, the PMOS transistor MP206 and the NMOS transistor MN206 are connected in series between an HVDD power supply terminal and a ground terminal GND. A common node of the PMOS transistor MP206 and the NMOS transistor MN206 serves as the output terminal of the inverter circuit IV204. At the gate of the PMOS transistor MP206 and the NMOS transistor MN206, an output signal of the inverter circuit IV203 is received. Accordingly, the inverter circuit IV204 produces, in accordance with the clock signal CLK3, an output signal whose high-level potential is ½ VDD and whose low-level potential is the ground voltage GND.

One end of the capacitor C202 is connected to the output terminal of the inverter circuit IV204, and the other end thereof connected to the node N203.

It is noted that the PMOS transistors and the NMOS transistors are low-voltage transistors whose gate oxide film withstands the voltage equal to or smaller than the supply voltage VDD. The threshold voltage Vtp of the PMOS transistors and threshold voltage Vtn of the NMOS transistors are both equal to or smaller than ½ VDD.

Figure 9:
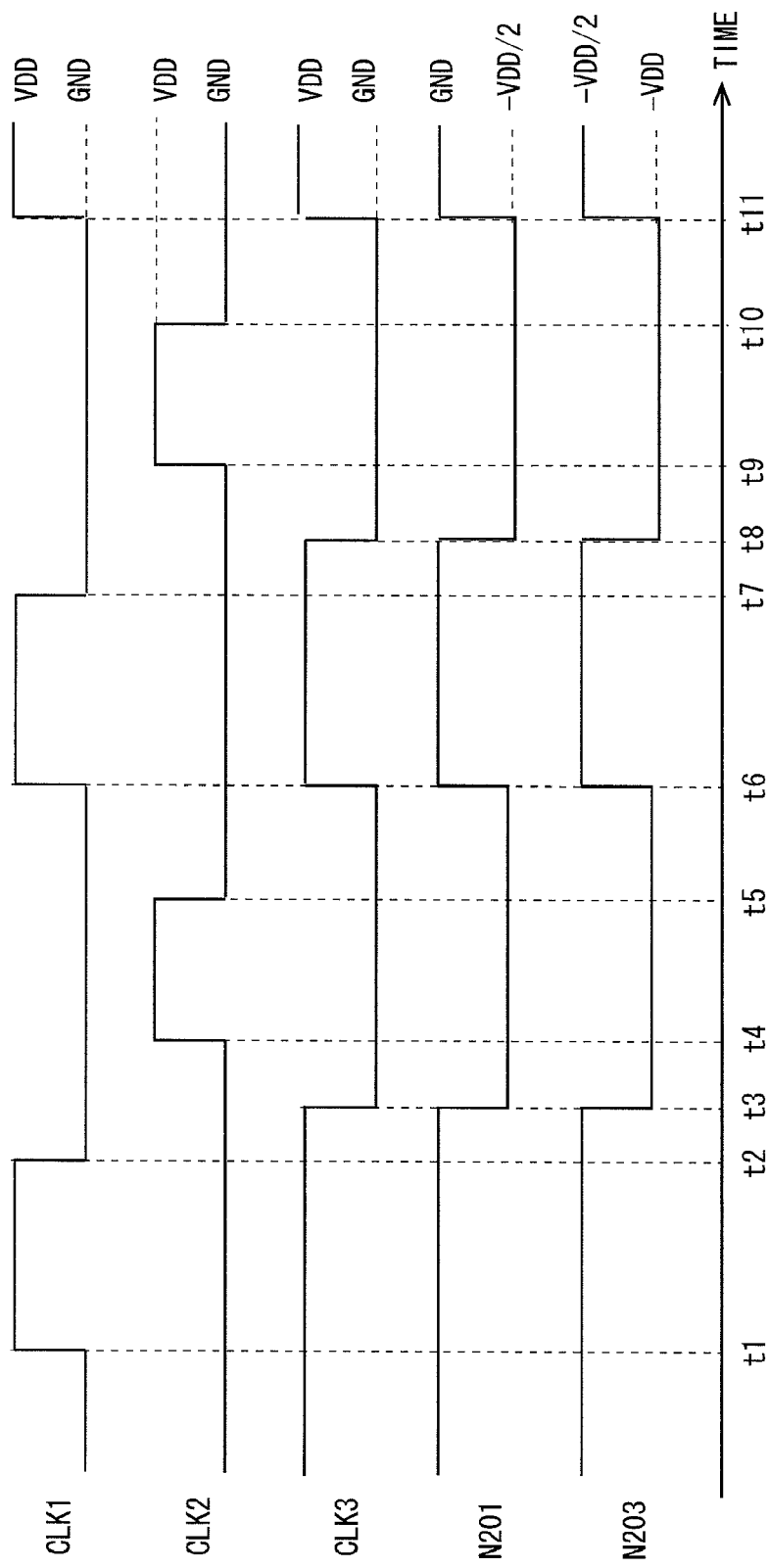
FIG. 9 is an operation timing chart of the booster circuit 200 in accordance with the second exemplary embodiment.

FIG. 9 is a timing chart for describing the operation of the booster circuit 200. Here, explanations are separately given of the operation of a circuit unit 201 and of a circuit unit 202 shown in FIG. 9. The operation of the circuit unit 201 is explained with reference to time points from t1 to t6, and the operation of the circuit unit 202 is explained with reference to time points from t6 to t11.

Figure 10:
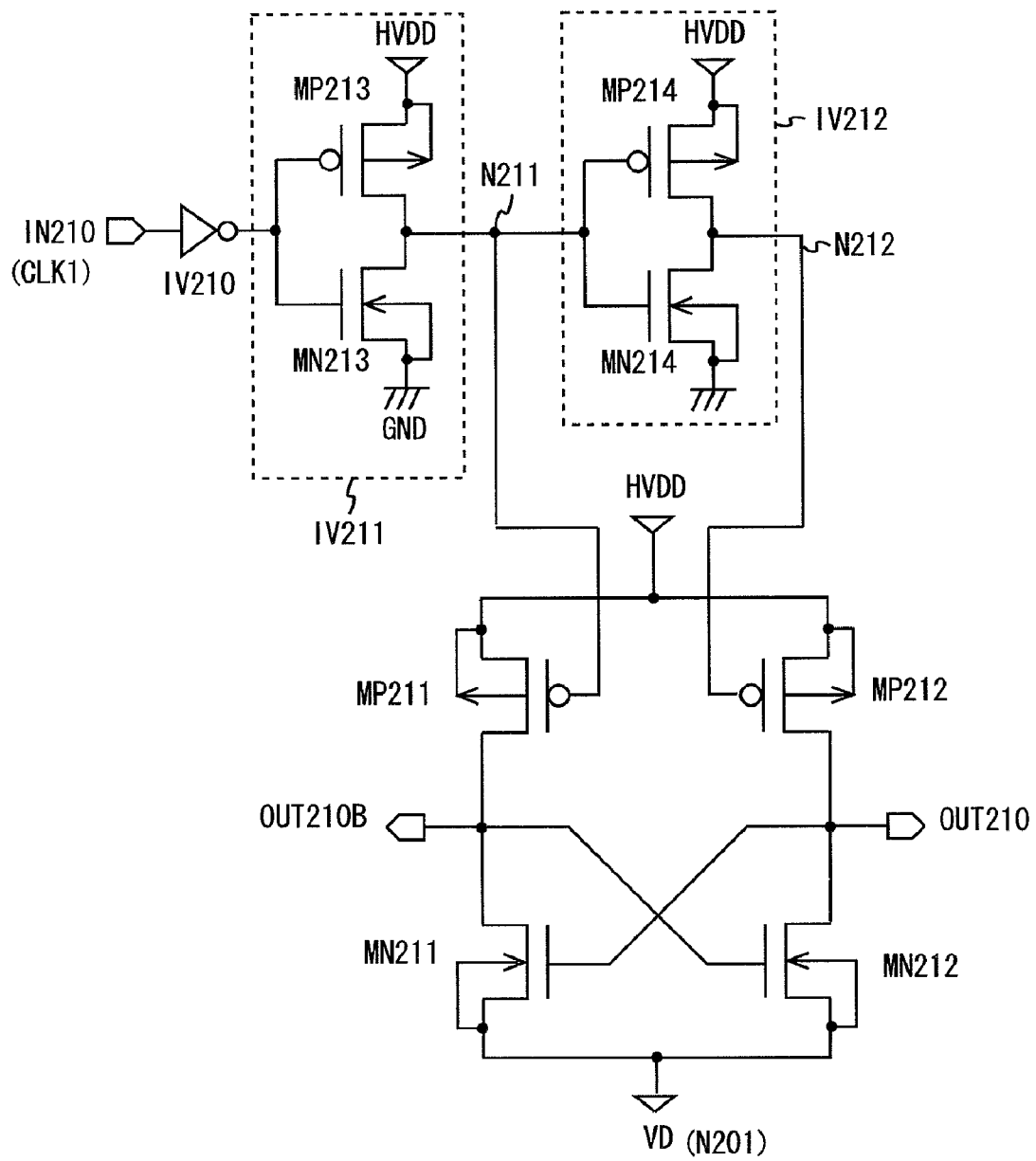
FIG. 10 shows a circuit structure of a level shifter LS201 in accordance with the second exemplary embodiment.

First, as shown in FIG. 10, in connection with the operation of the circuit unit 201, during the period from time points t1 to t2, the clock signal CLK1 is at high level, and the NMOS transistor MN201 is in ON state. Accordingly, the ground terminal GND and the node N201 are electrically connected to each other, causing the potential of the node N201 to be the ground voltage GND. On the other hand, during this period, the clock signal CLK3 is at high level, and the potential output from the inverter circuit IV202 is ½ VDD. Therefore, the potential of one end of the capacitor C201 becomes the ground voltage GND, and the capacitor C201 is charged by the potential difference ½ VDD.

At time point t2, the clock signal CLK1 falls to low level. Accordingly, the ground voltage GND and the node N201 are electrically disconnected from each other. As the NMOS transistor MN202 is also in OFF state due to the clock signal CLK2, the node N201 becomes high impedance. However, since the capacitor C201 is charged, the potential of the node N101 is maintained at the ground voltage GND.

At time point t3, the clock signal CLK3 falls to low level. Accordingly, the potential output from the inverter circuit IV202 becomes the ground voltage GND. Hence, the potential of one end of the capacitor C201 becomes the ground voltage GND, and the potential of the other end of the capacitor C201 falls by ½ VDD. Hence, the potential of the node N201 becomes −½ VDD.

During the period from time points t4 to t5, the clock signal CLK2 is at high level and the NMOS transistor MN202 is in ON state. Hence, the node N201 and the node N202 are electrically connected to each other, and the potential of the node N202 becomes −½ VDD.

At time point t5, the clock signal CLK2 falls to low level. Accordingly, the node N201 and the node N202 are electrically disconnected from each other.

Next, as shown in FIG. 10, in connection with the operation of the circuit unit 202, during the period from time points t6 to t7, the clock signal CLK1 is at low level, and the NMOS transistor MN203 is in ON state. Accordingly, the node N202 and the node N203 are electrically connected to each other, and the potential of the node N203 becomes −½ VDD. On the other hand, during this period, the clock signal CLK3 is at high level, and the potential output from the inverter circuit IV204 is ½ VDD. Therefore, the potential of one end of the capacitor C202 becomes −½ VDD and the capacitor C202 is charged by the potential difference VDD.

At time point t7, the clock signal CLK1 falls to low level. Accordingly, the node N202 and the node N203 are electrically disconnected from each other. As the NMOS transistor MN204 is also in OFF state due to the clock signal CLK2, the node N203 becomes high impedance. However, since the capacitor C202 is charged, the potential of the node N203 is maintained at −½ VDD.

At time point t8, the clock signal CLK3 falls to low level. Accordingly, the potential output from the inverter circuit IV202 becomes the ground voltage GND. Hence, a potential of the ground voltage GND is applied to one end of the capacitor C202, and the potential of the other end of the capacitor C202 falls by ½ VDD. Hence, the potential of the node N203 becomes −VDD (=−½ VDD−½ VDD).

During the period from time points from t9 to t10, the clock signal CLK2 is at high level, and the NMOS transistor MN204 is in ON state. Accordingly, the node N203 and the output terminal OUT201 are electrically connected to each other, and the potential of the output terminal becomes −VDD.

At time point t11, the clock signal CLK2 falls to low level. Accordingly, the node N203 and the output terminal OUT201 are electrically disconnected from each other.

Figure 11:
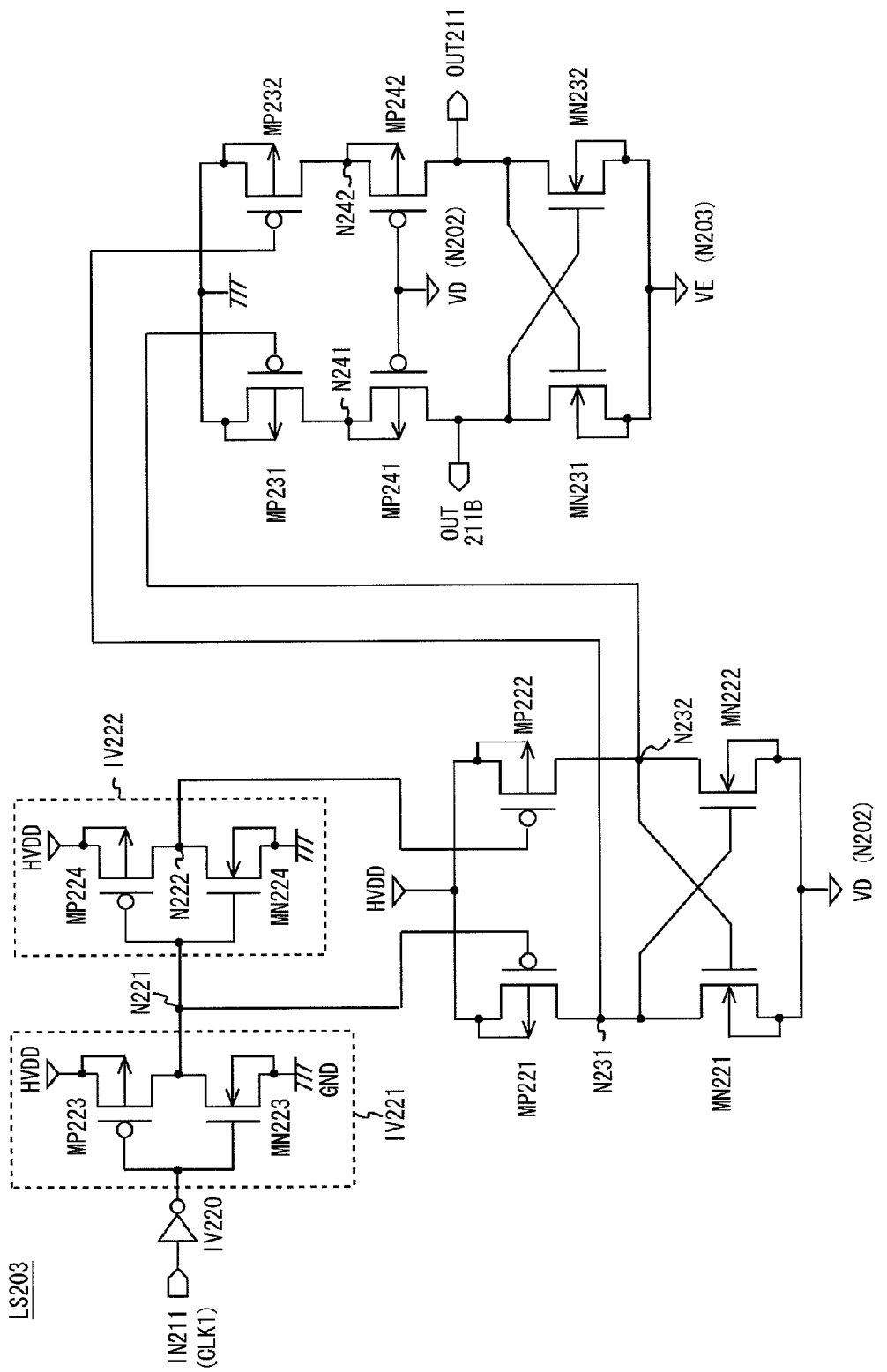
FIG. 11 shows the circuit structure of a level shifter LS203 in accordance with the second exemplary embodiment.
Figure 14:
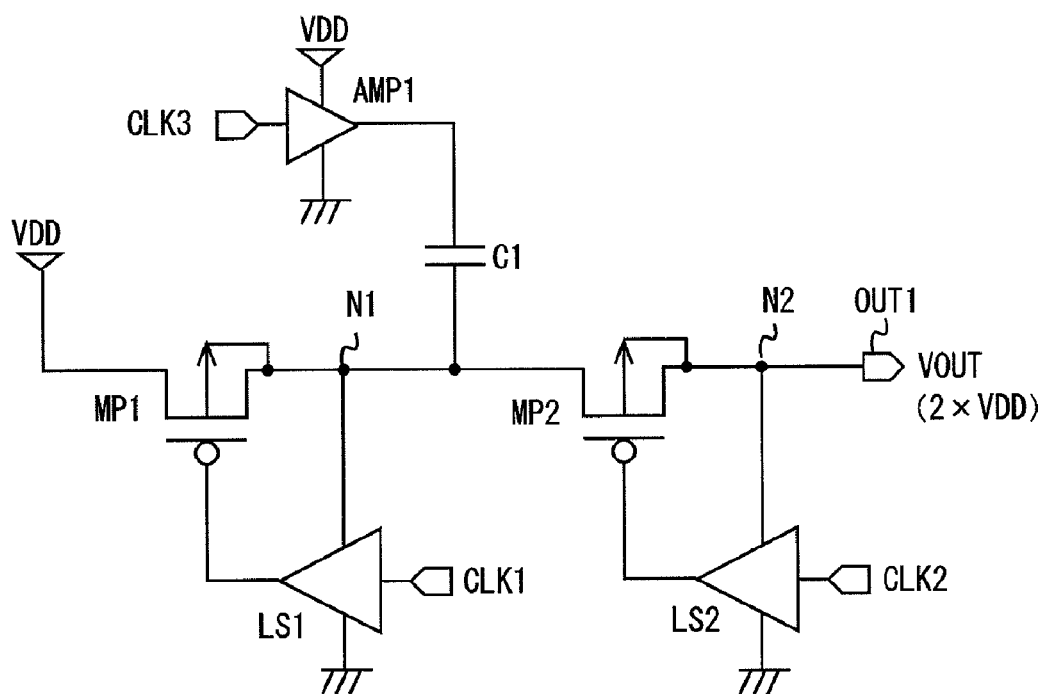
FIG. 14 shows a circuit structure of a conventional positive-potential booster circuit 1.
Figure 15:
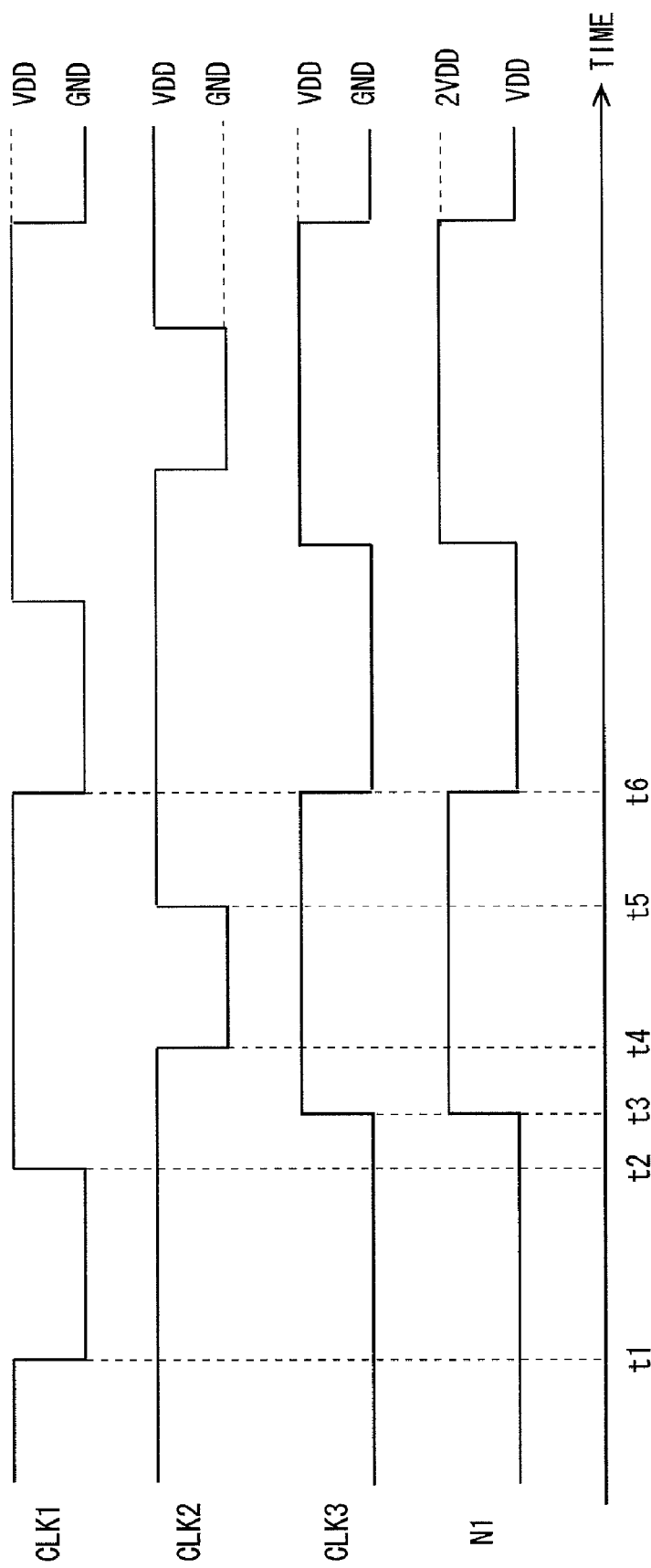
FIG. 15 is an operation timing chart of the conventional positive-potential booster circuit 1.
Figure 16:
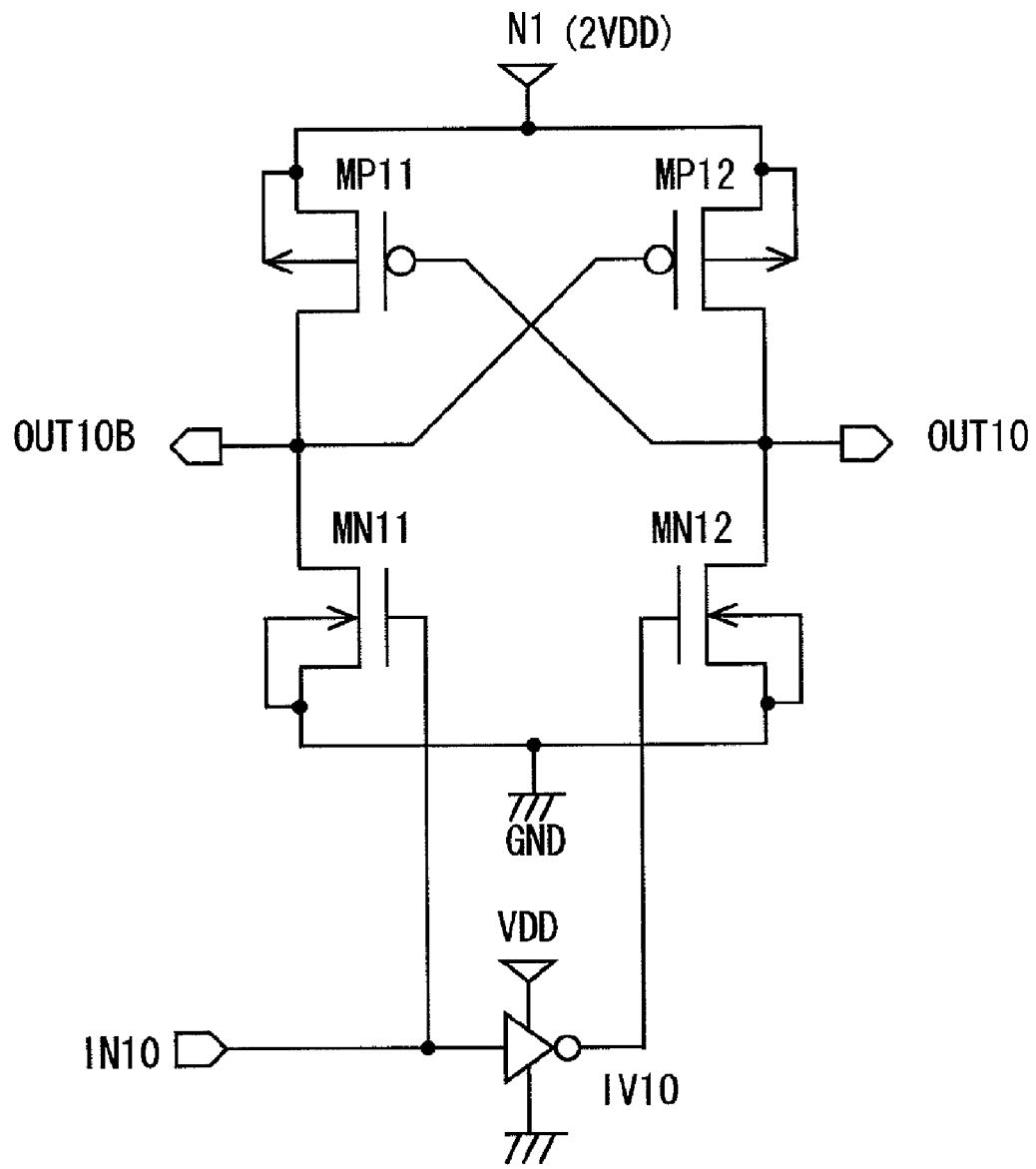
FIG. 16 is a circuit structure of a conventional level shifter LS1.
Figure 18:
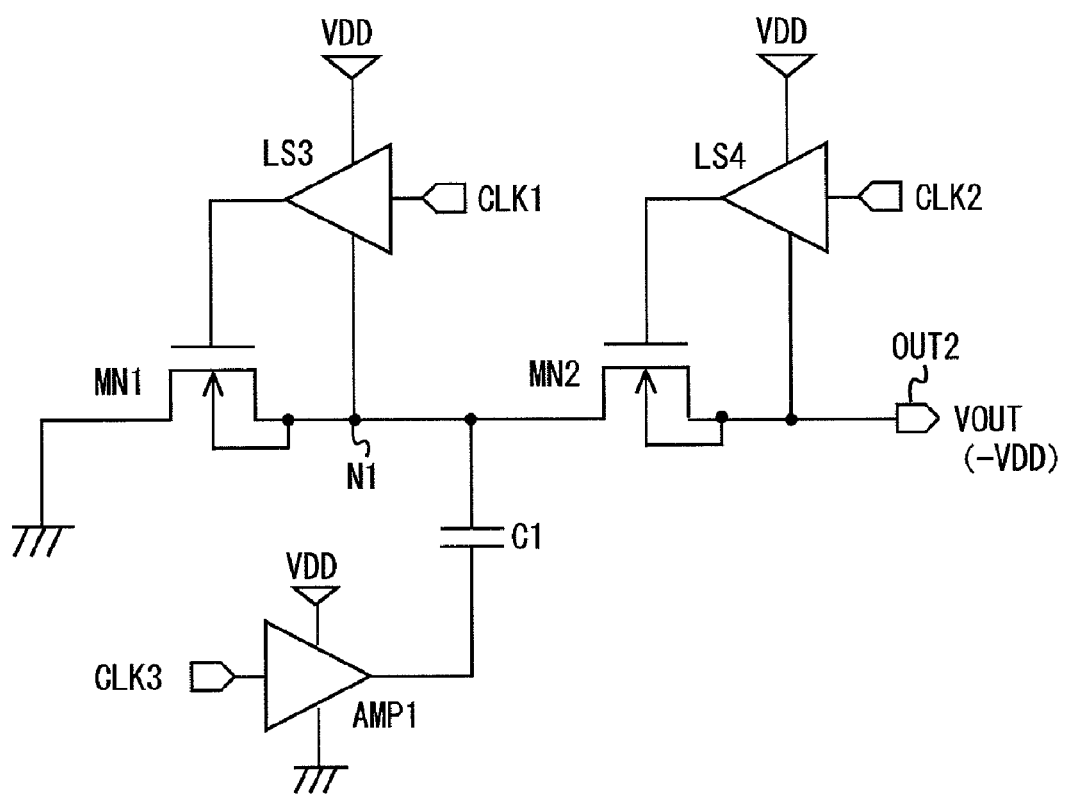
FIG. 18 shows a circuit structure of the conventional negative-potential booster circuit 2.
Figure 19:
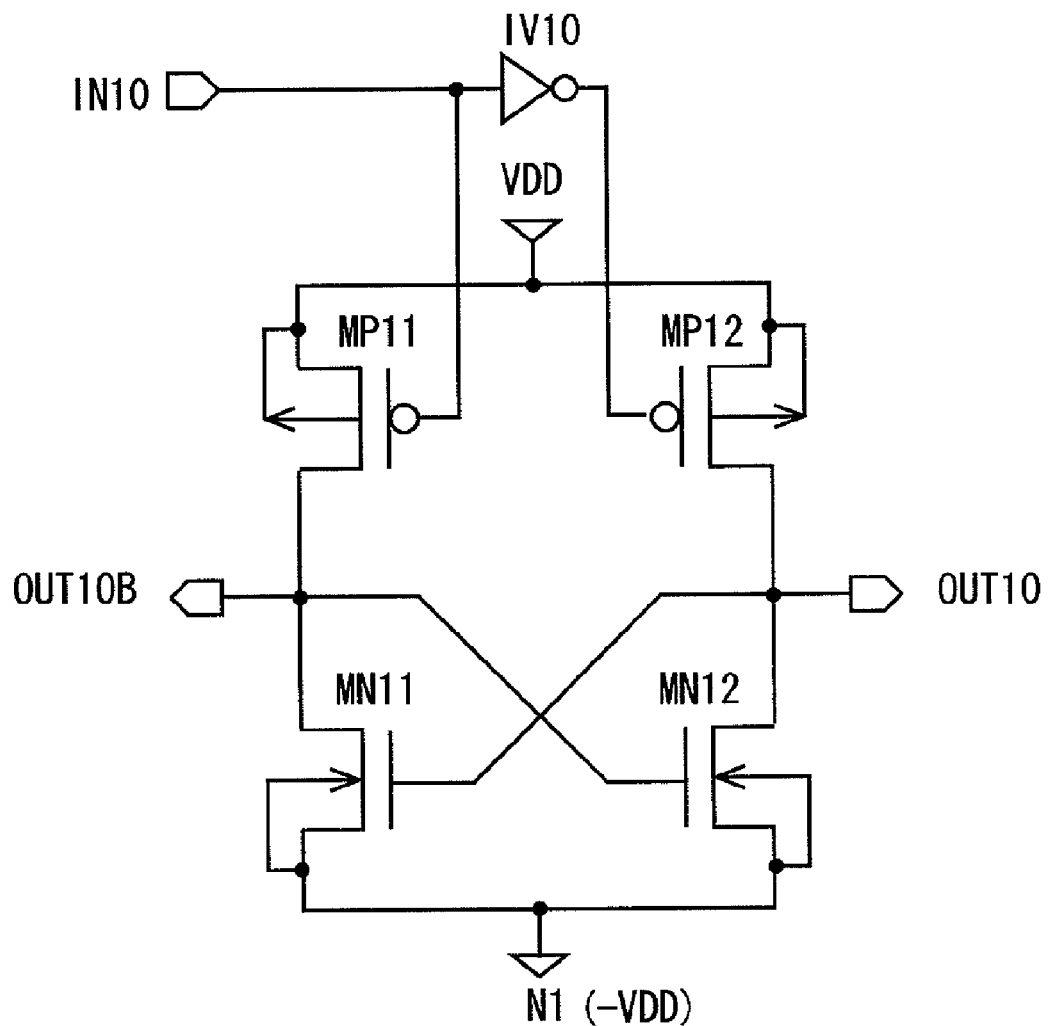
FIG. 19 is a circuit structure of a conventional level shifter LS3.

Here, during the periods from time points t3 to t6 and from t8 to t11, the potential of the node N201 and that of the node N203 are respectively smaller than the ground voltage GND and the potential of the node N202, i.e., −½ VDD. Therefore, in order to prevent backflow of current from the ground terminal GND and the node N202, it is necessary to turn off the NMOS transistors MN201 and MN203 during the periods from time point t2 to t6 and from t7 to t11. To this end, the level shifters LS201 and LS202 structured as shown in FIG. 10 are used in the circuit unit 201, and the level shifters LS203 and LS204 structured as shown in FIG. 11 are used in the circuit unit 202.

FIG. 10 shows the structure of the level shifter LS201. Here, as the level shifter LS202 is substantially similarly structured as the level shifter LS201, the explanation thereof is omitted, unless otherwise noted. As shown in FIG. 10, the level shifter LS201 includes PMOS transistors MP211 and MP212, NMOS transistors MN211 and MN212, an input terminal IN210, output terminals OUT210 and OUT210B, and inverter circuits IV210, IV211, and IV212. At the input terminal IN210, the clock signal CLK1 is received. An output signal from the output terminal OUT210 is provided to the gate of the NMOS transistor MN201 shown in FIG. 2.

Note that, in connection with the level shifter LS202, the clock signal CLK2 is received at the input terminal IN210. An output signal from the output terminal OUT210 is provided to the gate of the NMOS transistor MN202 shown in FIG. 2.

The source of the PMOS transistor MP211 (a third transistor) is connected to an HVDD power supply terminal (a third voltage supply terminal), the drain thereof being connected to the output terminal OUT210B (a third node), and the gate thereof being connected to the node N211. The source of the PMOS transistor MP212 (a fourth transistor) is connected to the HVDD power supply terminal, the drain thereof being connected to the output terminal OUT210 (fourth node), and the gate thereof being connected to a node N212.

The drain of the NMOS transistor MN211 (a fifth transistor) is connected to the output terminal OUT210B, the source thereof being connected to a power supply terminal VD, and the gate thereof being connected to the output terminal OUT210. The drain of the NMOS transistor MN212 (a sixth transistor) is connected to the output terminal OUT210, the source thereof being connected to the power supply terminal VD, and the gate thereof being connected to the output terminal OUT210B. Here, the power supply terminal VD is connected to the node N201 shown in FIG. 8. In connection with the level shifter LS202, the power supply terminal VD is connected to the node N202 shown in FIG. 8.

The input terminal of the inverter circuit IV210 is connected to the input terminal IN210, and the output terminal thereof is connected to the input terminal of the inverter circuit IV211. The input terminal of the inverter circuit IV211 is connected to the output terminal of the inverter circuit IV210, and the output terminal thereof is connected to a node N211. The input terminal of the inverter circuit IV212 is connected to the node N211, and the output terminal thereof is connected to the node N212.

As shown in FIG. 10, the inverter circuit IV211 (first inverter circuit) includes a PMOS transistor MP213 and an NMOS transistor MN213. The PMOS transistor MP213 and the NMOS transistor MN213 are connected in series between an HVDD power supply terminal and a ground terminal GND. A common node of the PMOS transistor MP213 and the NMOS transistor MN213 serves as the output terminal (the node N211) of the inverter circuit IV211. At the gate of the PMOS transistor MP213 and the NMOS transistor MN213, an output signal of the inverter circuit IV210 is received. Accordingly, the inverter circuit IV211 produces, in accordance with the clock signal CLK3, an output signal whose high-level potential is ½ VDD, and whose low-level potential is the ground voltage GND.

As shown in FIG. 10, the inverter circuit IV212 (a second inverter circuit) includes a PMOS transistor MP214 and an NMOS transistor MN214. The PMOS transistor MP214 and the NMOS transistor MN214 are connected in series between an HVDD power supply terminal and a ground terminal GND. A common node of the PMOS transistor MP214 and the NMOS transistor MN214 serves as the output terminal (the node N212) of the inverter circuit IV212. At the gate of the PMOS transistor MP214 and the NMOS transistor MN214, an output signal of the inverter circuit IV211 is received. Accordingly, the inverter circuit IV212 produces, in accordance with the clock signal CLK3, an output signal whose high-level potential is ½ VDD, and whose low-level potential is the ground voltage GND.

Next, FIG. 11 shows the structure of the level shifter LS203. Here, as the level shifter LS204 is substantially similarly structured as the level shifter LS203, the explanation thereof is omitted, unless otherwise noted. As shown in FIG. 11, the level shifter LS203 includes PMOS transistors MP221, MP222, MP231, MP232, MP241, and MP242, and NMOS transistors MN221, MN222, MN231, and MN232, an input terminal IN211, output terminals OUT211 and OUT211B, inverter circuits IV220, IV221, and IV222. At the input terminal IN211, the clock signal CLK1 is received. An output signal from the output terminal OUT211 is provided to the gate of the NMOS transistor MN203 shown in FIG. 8.

Note that, in connection with the level shifter LS204, the clock signal CLK2 is received at the input terminal IN211. An output signal from the output terminal OUT211 is provided to the gate of the NMOS transistor MN204 shown in FIG. 8.

The source of the PMOS transistor MP221 (a ninth transistor) is connected to an HVDD terminal, the drain thereof being connected to a node N231 (a seventh node), and the gate thereof being connected to a node N221. The source of the PMOS transistor MP222 (a tenth transistor) is connected to the HVDD terminal, the gate thereof being connected to a node N232 (an eighth node), and the gate thereof being connected to a node N222.

The drain of the NMOS transistor MN221 (a fifteenth transistor) is connected to the node N231, the source thereof being connected to a power supply terminal VD (a fourth voltage supply terminal), and the gate thereof being connected to the node N232. The drain of the NMOS transistor MN222 (a sixteenth transistor) is connected to the node N232, the source thereof being connected to the power supply terminal VD, and its gate being connected to the node N231. Here, the power supply terminal VD is connected to the node N202 shown in FIG. 8. Note that, in connection with the level shifter LS204, the power supply terminal VD is connected to the node N203 shown in FIG. 8.

The input terminal of the inverter circuit IV220 is connected to the input terminal IN211, and the output terminal thereof is connected to the input terminal of the inverter circuit IV221. The input terminal of the inverter circuit IV221 is connected to the output terminal of the inverter circuit IV220, and the output terminal thereof is connected to the node N221. The input terminal of the inverter circuit IV222 is connected to the node N221 and the output terminal thereof is connected to the node N222.

As shown in FIG. 11, the inverter circuit IV221 (a third inverter circuit) includes a PMOS transistor MP223 and an NMOS transistor MN223. The PMOS transistor MP223 and the NMOS transistor MN223 are connected in series between an HVDD power supply terminal and a ground terminal GND. A common node of the PMOS transistor MP223 and the NMOS transistor MN223 serves as the output terminal (the node N221) of the inverter circuit IV221. At the gate of the PMOS transistor MP223 and the NMOS transistor MN223, an output signal of the inverter circuit IV220 is received. Accordingly, the inverter circuit IV221 produces, in accordance with the clock signal CLK3, an output signal whose high-level potential is ½ VDD, and whose low-level potential is the ground voltage GND.

As shown in FIG. 11, the inverter circuit IV222 (a fourth inverter circuit) includes a PMOS transistor MP224 and an NMOS transistor MN224. The PMOS transistor MP224 and the NMOS transistor MN224 are connected in series between an HVDD power supply terminal and a ground terminal GND. A common node of the PMOS transistor MP224 and the NMOS transistor MN224 serves as the output terminal (the node N222) of the inverter circuit IV222. At the gate of the PMOS transistor MP224 and the NMOS transistor MN224, an output signal of the inverter circuit IV221 is received. Accordingly, the inverter circuit IV222 produces, in accordance with the clock signal CLK3, an output signal whose high-level potential is ½ VDD, and whose low-level potential is the ground voltage GND.

The source of the PMOS transistor MP231 (an eleventh transistor) is connected to a ground terminal GND (a fifth voltage supply terminal), the drain thereof being connected to a node N241 (a ninth node), the gate thereof being connected to the node N232. The source of the PMOS transistor MP232 (a twelfth transistor) is connected to the ground terminal GND, the drain thereof being connected to a node N242 (a tenth node), and the gate thereof being connected to the node N231. The source of the PMOS transistor MP241 (a thirteenth transistor) is connected to the node N241, the drain thereof being connected to the output terminal OUT211B (an eleventh node), and the gate thereof being connected to a power supply terminal VD. The source of the PMOS transistor MP242 (a fourteenth transistor) is connected to the node N242, the drain thereof being connected to the output terminal OUT211 (a twelfth node), and the gate thereof being connected to the power supply terminal VD.

The drain of the NMOS transistor MN231 (a seventeenth transistor) is connected to the output terminal OUT211B, the source thereof being connected to a power supply terminal VE (a sixth voltage supply terminal), and the gate thereof being connected to the output terminal OUT211. The drain of the NMOS transistor MN232 (an eighteenth transistor) is connected to the output terminal OUT211, the source thereof being connected to the power supply terminal VE, and the gate thereof being connected to the output terminal OUT211B. Here, the power supply terminal VE is connected to the node N203 shown in FIG. 8. Note that, in connection with the level shifter LS204, the power supply terminal VE is connected to the output terminal OUT201 shown in FIG. 8.

It is noted that the all of the PMOS transistors and the NMOS transistors structuring the level shifter LS201, LS202, LS203, and LS204 described above are low-voltage transistors whose gate oxide film withstands the voltage equal to or smaller than the supply voltage VDD. The threshold voltage Vtp of the PMOS transistor and the threshold voltage Vtn of the NMOS transistor are both equal to or smaller than ½ VDD. Further, as can be seen from FIG. 11, it can also be construed that the level shifter LS203 (and LS204) is structured with two level shifters connected to each other at the nodes N231 and N232. As to such two level shifters also, the potential difference between the high-potential supply voltage and the low-potential supply voltage falls within the value of the VDD.

Here, an explanation is given of the circuit unit 201, focusing on the operation of the level shifter LS201. It is to be noted that the operation of the level shifter LS202 is similar to that of the level shifter LS201 except that the input clock signal is CLK2, and therefore an explanation thereof is omitted. FIG. 12 is a table showing the relationship between the clock signal CLK1 being provided to the input terminal IN210 of the level shifter LS201 and the potential of each of the output terminal OUT210 (and the inverted output terminal OUT210B), the node N211 and N212.

As shown in the table of FIG. 12, when the clock signal CLK1 being provided to the input terminal IN210 is at low level (i.e., at the ground voltage GND), the potential of the output terminal OUT210 and that of the output terminal OUT210B are −½ VDD and ½ VDD, respectively. The potential of the node N211 and that of the node N212 are the ground voltage GND, and ½ VDD, respectively. To the contrary, when the clock signal CLK1 being provided to the input terminal IN210 is at high level (i.e., at the supply voltage VDD), the potential of the output terminal OUT210 and that of the output terminal OUT210B are ½ VDD and −½ VDD, respectively. The potential of the node N211 and that of the node N212 are ½ VDD and the ground voltage GND, respectively.

The level shifter LS202 operates similarly in accordance with the clock signal CLK2. Thus, the potential difference between the gate and the drain or between the gate and the source of the transistors included in the level shifters LS201 and LS202 can be set to fall within the value of the supply voltage VDD.

As explained in the foregoing, the level shifter LS201 outputs −½ VDD when the clock signal CLK1 is at low level and outputs ½ VDD when the clock signal CLK1 is at high level. In accordance with the output of the level shifter LS201, the ON/OFF operation of the NMOS transistor MN201 shown in FIG. 8 is controlled. The level shifter LS202 similarly outputs −½ VDD when the clock signal CLK2 is at low level, and outputs ½ VDD when the clock signal CLK2 is at high level. In accordance with the output of the level shifter LS102, the ON/OFF operation of the NMOS transistor MN202 shown in FIG. 8 is controlled. Thus, the potential difference between the gate and the drain or between the gate and the source of each of the NMOS transistor MN201 and MN202 can be set to fall within the value of the supply voltage VDD. In this manner, as every transistor used in the circuit unit 201, a low-voltage transistor can be adopted.

Now, consideration is further given to the initial state of the booster circuit 200. In the initial state of the booster circuit 200, the capacitor C201 is not charged, and the node N201 is not negatively boosted even when the clock signal CLK3 is at low level. Accordingly, the potential of the node N201 is GND, rather than −½ VDD. Hence, the potential of the power supply terminal VD, which is a low-potential supply voltage of the level shifter LS201, is also GND.

Figure 23:
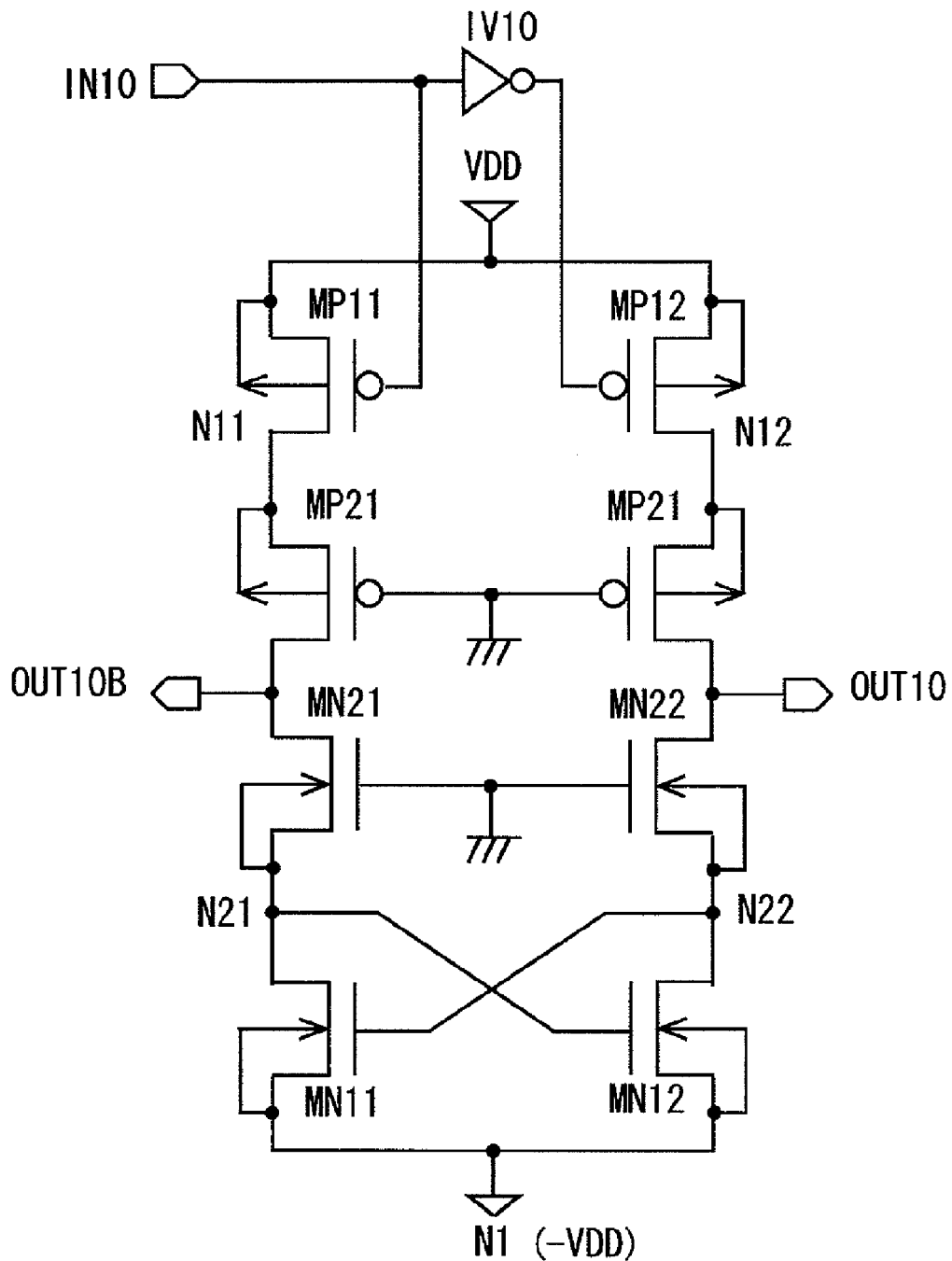
FIG. 23 is a circuit structure of a conventional level shifter LS30.

Turning now to the conventional level shifter LS30 shown in FIG. 23 in which the field relaxation circuit technique is employed, when the low-potential supply voltage is GND, the NMOS transistors MN22 or MN21 does not turn on, resulting in an irregular potential of the output terminal OUT10.

To the contrary, with the level shifter LS201 in accordance with the second exemplary embodiment, even when the potential of the power supply terminal VD is GND, the potential difference between the source and the gate of the NMOS transistor MP212 or MP211 can be set to ½ VDD, causing the NMOS transistor MN212 or MN211 to turn on. Hence, the potential of the output terminal OUT210 does not become irregular, and the level shifter LS201 correctly operates even in the initial state. Thus, it becomes possible to surely turn off the NMOS transistor MN201, and the correct operation of the circuit unit 201 can be achieved.

Next, an explanation is given of the circuit unit 202, focusing on the operation of the level shifter LS203. It is to be noted that the operation of the level shifter LS204 is similar to that of the level shifter LS203 except that the input clock signal is CLK2 and therefore an explanation thereof is omitted. FIG. 13 is a table showing the relationship between the clock signal CLK1 being provided to the input terminal IN211 of the level shifter LS203 and the potential of each of the output terminal OUT211 (and the inverted output terminal OUT211B), the nodes N221, N222, N231, N232, N241, and N242. Here, "Vtp" denotes the threshold voltage of the PMOS transistors.

As shown in the table of FIG. 13, when the clock signal CLK1 provided to the input terminal IN211 is at low level (i.e., at the ground voltage GND), the potential of the output terminal OUT211 and that of the output terminal OUT211B are −VDD and GND, respectively. The potential of the node N221 and that of the N222 are GND and ½ VDD, respectively. The potential of the node N231 and that of the node N232 are ½ VDD and −½ VDD, respectively. The potential of the node N241 and that of the node N242 are GND and −VDD+Vtp, respectively.

To the contrary, when the clock signal CLK1 provided to the input terminal IN211 is at high level (i.e., at the supply voltage VDD), the potential of the output terminal OUT211 and that of the output terminal OUT211B are GND and −VDD, respectively. The potential of the node N221 and that of the node N222 are ½ VDD and GND, respectively. The potential of the node N231 and that of the node N232 are −½ VDD and ½ VDD, respectively. The potential of the node N241 and that of the node N242 are −VDD+Vtp and GND, respectively.

The level shifter LS204 operates similarly in accordance with the clock signal CLK2. Thus, the potential difference between the gate and the drain or between the gate and the source of the transistors included in the level shifters LS203 and LS204 can be set to fall within the value of the supply voltage VDD.

As explained in the foregoing, the level shifter LS203 outputs −VDD when the clock signal CLK1 is at low level, and outputs GND when the clock signal CLK1 is at high level. In accordance with the output of the level shifter LS203, the ON/OFF operation of the NMOS transistor MN203 shown in FIG. 8 is controlled. The level shifter LS204 similarly outputs −VDD when the clock signal CLK2 is at low level, and outputs GND when the clock signal CLK2 is at high level. In accordance with such outputs of the level shifter LS204, the ON/OFF operation of the NMOS transistor MN204 shown in FIG. 8 is controlled. Thus, the potential difference between the gate and the drain or between the gate and the source of each of the NMOS transistors MN203 and MN204 can be set to fall within the value of the supply voltage VDD. In this manner, as every transistor used in the circuit unit 202, a low-voltage transistor can be adopted.

As in the foregoing, with the booster circuit 200, even when all the transistors used therefor are low-voltage transistors, the output voltage VOUT as great as −VDD can be obtained. With the conventional level shifter shown in FIG. 23 in which the field relaxation circuit technique is employed, since the level shifter outputs an irregular potential in the initial state where the operation is started, the negatively boosting operation cannot be carried out. To the contrary, the level shifter LS201 of the booster circuit 200 in accordance with the second exemplary embodiment does not output an irregular voltage even in the initial state where the operation is started. Accordingly, the booster circuit 200 can correctly start the boosting operation.

The present invention is not limited to the embodiments explained above, and can be modified as appropriate in so far as not deviating from its principle. For example, the booster circuit 100 or 200 can be formed in a further multi-stage structure, so as to boost the output voltage further higher than 2VDD or further negatively than −VDD.

In accordance with the first and second exemplary embodiments, it is specified that the amplitude level of the output signal produced by one inverter circuit that is applied to one end of corresponding capacitor is ½ VDD. However, this amplitude level may be equal to or smaller than ½ VDD. For example, in accordance with the first exemplary embodiment, the potential of the HVDD terminal of the inverter circuit IV102 included in the circuit unit 101 is reduced from ½ VDD by a potential ΔV1. Note that, in this case, the boosting level of the node connected to the other end of the capacitor C101 is also reduced from ½ VDD by ΔV1. Hence, the potential of each of the HVDD terminals of the level shifters LS101 and LS102 are likewise reduced from ½ VDD by ΔV1. Further, the potential applied to the gate of the NMOS transistors MN121 and 122 as well as the high-potential supply voltage of the inverter circuit IV110 are set to be twice as great as the potential of the HVDD terminals.

While the invention has been described in terms of several exemplary embodiments, those skilled in the art will recognize that the invention can be practiced with various modifications within the spirit and scope of the appended claims and the invention is not limited to the examples described above.

Further, the scope of the claims is not limited by the exemplary embodiments described above.

Furthermore, it is noted that, Applicant's intent is to encompass equivalents of all claim elements, even if amended later during prosecution.

The first and second exemplary embodiments can be combined as desirable by one of ordinary skill in the art.

What is claimed is:
1. A booster circuit that boosts a first supply voltage to one of a positive prescribed voltage and a negative prescribed voltage, comprising:
a first transistor that is connected to a first node;
a first capacitive element that has one end connected to the first node, and that is charged with a voltage of the first node when the first transistor is activated; and a first control signal generating circuit that provides a control terminal of the first transistor with a first control signal being in accordance with a first clock signal, wherein when the first transistor is de-activated, the first capacitive element boosts a voltage of the first node to one of a positive first voltage and a negative first voltage by a voltage being applied to other end of the first capacitive element, the voltage applied to the other end being at least ½ as great as the first supply voltage, and the first control signal generating circuit sets a voltage of the first control signal when the first transistor is de-activated to be the first voltage of the first node, and sets a voltage of the first control signal when the first transistor is activated to be a voltage, difference between the voltage and the first voltage being equal to or smaller than a value of the first supply voltage.

2. The booster circuit according to claim 1, further comprising:

a second transistor that is connected between the first node and a second node; and a second control signal generating circuit that provides a control terminal of the second transistor with a second control signal being in accordance with a second clock signal, and that activates the second transistor when the first transistor is de-activated, wherein the second control signal generating circuit sets a voltage of the second control signal when the second transistor is de-activated to be a second voltage of the second node, and sets a voltage of the second control signal when the second transistor is activated to be a voltage, difference between the voltage and the second voltage being equal to or smaller than a value of the first supply voltage.

3. The booster circuit according to claim 2, wherein the first and second transistors are of a first conductivity type, the first transistor being connected between a first power supply terminal and the first node, the first power supply terminal supplying the first supply voltage.

4. The booster circuit according to claim 3, wherein the first control signal generating circuit includes third and fourth transistors of the first conductivity type, fifth to eighth transistors of a second conductivity type, and first to third voltage supply terminals, the first voltage supply terminal supplies a voltage of the first node, the second voltage supply terminal supplies the first supply voltage, the third voltage supply terminal supplies a voltage ½ as great as the first supply voltage, the third transistor is connected between the first voltage supply terminal and a third node, the third transistor having its control terminal connected to a fourth node, the fourth transistor is connected between the first voltage supply terminal and the fourth node, the fourth transistor having its control terminal connected to the third node, the fifth transistor is connected between the third node and a fifth node, the fifth transistor having its control terminal connected to the second voltage supply terminal, the sixth transistor is connected between the fourth node and a sixth node, the sixth transistor having its control terminal connected to the second voltage supply terminal, the seventh transistor is connected between the fifth node and the third voltage supply terminal, the seventh transistor receiving at its control terminal the first clock signal having an amplitude level of the first supply voltage, the eighth transistor is connected between the sixth node and the third voltage supply terminal, the eighth transistor receiving at its control terminal an inverted signal of the first clock signal, and the fourth node is an output terminal of the first control signal generating circuit.

5. The booster circuit according to claim 4, wherein the second control signal generating circuit has a circuit structure similarly to a circuit structure of the first control signal generating circuit, except that the first voltage supply terminal supplies a voltage of the second node, the seventh transistor receives at its control terminal the second clock signal having the amplitude level of the first supply voltage, the eighth transistor receives at its control terminal an inverted signal of the second clock signal, and that the fourth node is an output terminal of the second control signal generating circuit.

6. The booster circuit according to claim 5, further comprising:

a ninth transistor of the first conductivity type that is connected between the second node and a seventh node;

a second capacitive element that has one end connected to the seventh node, and that is charged with a voltage of the seventh node when the ninth transistor is activated; and a third control signal generating circuit that provides a control terminal of the ninth transistor with a third control signal being in accordance with the first clock signal, wherein when the ninth transistor is de-activated, the second capacitive element boosts a voltage of the seventh node to a positive third voltage by a voltage being applied to other end of the second capacitive element, the voltage applied to the other end being at least ½ as great as the first supply voltage, and the third control signal generating circuit sets a voltage of the third control signal when the ninth transistor is de-activated to be the third voltage of the seventh node, and sets a voltage of the third control signal when the ninth transistor is activated to be a voltage, difference between the voltage and the third voltage being equal to or smaller than a value of the first supply voltage.

7. The booster circuit according to claim 6, further comprising:

a tenth transistor of the first conductivity type that is connected between the seventh node and an eighth node; and a fourth control signal generating circuit that provides a control terminal of the tenth transistor with a fourth control signal being in accordance with the second clock signal, and that activates the tenth transistor when the ninth transistor is de-activated, wherein the fourth control signal generating circuit sets a voltage of the fourth control signal when the tenth transistor is de-activated to be a fourth voltage of the eighth node, and sets a voltage of the fourth control signal when the tenth transistor is activated to be a voltage, difference between the voltage and the fourth voltage being equal to or smaller than a value of the first supply voltage.

8. The booster circuit according to claim 7, wherein the third control signal generating circuit includes eleventh to fourteenth transistors of the first conductivity type, fifteenth to twenty-second transistors of the second conductivity type, and fourth to seventh voltage supply terminals, the fourth voltage supply terminal supplies a voltage of the second node, the fifth voltage supply terminal supplies the first supply voltage, the sixth voltage supply terminal supplies a voltage ½ as great as the first supply voltage, the seventh voltage supply terminal supplies a voltage of the seventh node, the eleventh transistor is connected between the fourth voltage supply terminal and a ninth node, the eleventh transistor having its control terminal connected to a tenth node, the twelfth transistor is connected between the fourth voltage supply terminal and the tenth node, the twelfth transistor having its control terminal connected to the ninth node, the fifteenth transistor is connected between the ninth node and an eleventh node, the fifteenth transistor having its control terminal connected to the fifth voltage supply terminal, the sixteenth transistor is connected between the tenth node and a twelfth node, the sixteenth transistor having its control terminal connected to the fifth voltage supply terminal, the seventeenth transistor is connected between the eleventh node and the sixth voltage supply terminal, the seventeenth transistor receiving at its control terminal the first clock signal, the eighteenth transistor is connected between the twelfth node and the sixth voltage supply terminal, the eighteenth transistor receiving at its control terminal an inverted signal of the first clock signal, the thirteenth transistor is connected between the seventh voltage supply terminal and a thirteenth node, the thirteenth transistor having its control terminal connected to a fourteenth node, the fourteenth transistor is connected between the seventh voltage supply terminal and the fourteenth node, the fourteenth transistor having its control terminal connected to the thirteenth node, the nineteenth transistor is connected between the thirteenth node and a fifteenth node, the nineteenth transistor having its control terminal connected to the fourth voltage supply terminal, the twentieth transistor is connected between the fourteenth node and a sixteenth node, the twentieth transistor having its control terminal connected to the fourth voltage supply terminal, the twenty-first transistor is connected between the fifteenth node and the fifth voltage supply terminal, the twenty-first transistor having its control terminal connected to the tenth node, the twenty-second transistor is connected between the sixteenth node and the fifth voltage supply terminal, the twenty-second transistor having its control terminal connected to the ninth node, and the fourteenth node is an output terminal of the third control signal generating circuit.

9. The booster circuit according to claim 8, wherein the fourth control signal generating circuit has a circuit structure similarly to a circuit structure of the third control signal generating circuit, except that the fourth voltage supply terminal supplies a voltage of the second node, the seventh voltage supply terminal supplies a voltage of the seventh node, the seventeenth transistor receives at its control terminal the second clock signal, the eighteenth transistor receives at its control terminal an inverted signal of the second clock signal, and that the fourteenth node is an output terminal of the fourth control signal generating circuit.

10. The booster circuit according to claim 2, wherein the first and second transistors are of a second conductivity type, the first transistor being connected between a second power supply terminal and the first node, the second power supply terminal supplying a ground voltage.

11. The booster circuit according to claim 10, wherein the first control signal generating circuit includes third and fourth transistors of the first conductivity type, fifth and sixth transistors of a second conductivity type, first and second inverter circuits, and first and second voltage supply terminals, the first voltage supply terminal supplies a voltage ½ as great as the first supply voltage, the second voltage supply terminal supplies a voltage of the first node, a high-potential supply voltage of the first inverter circuit is a potential of the first voltage supply terminal, and a low-potential supply voltage of the first inverter circuit is the ground voltage, the first inverter circuit receiving at its input a signal being in accordance with the first clock signal, a high-potential supply voltage of the second inverter circuit is a voltage of the first voltage supply terminal, and a low-potential supply voltage of the second inverter circuit is the ground voltage, the second inverter circuit receiving at its input an output of the first inverter circuit, the third transistor is connected between the first voltage supply terminal and a third node, the third transistor receiving at its control terminal an output of the first inverter circuit, the fourth transistor is connected between the first voltage supply terminal and a fourth node, the fourth transistor receiving at its control terminal an output of the second inverter circuit, the fifth transistor is connected between the third node and the second voltage supply terminal, the fifth transistor having its control terminal connected to the fourth node, the sixth transistor is connected between the fourth node and the second voltage supply terminal, the sixth transistor having its control terminal connected to the third node, and the fourth node is an output terminal of the first control signal generating circuit.

12. The booster circuit according to claim 11, wherein the second control signal generating circuit has a circuit structure similarly to a circuit structure of the first control signal generating circuit, except that the second voltage supply terminal supplies a voltage of the second node, the first inverter circuit receives at its input a signal being in accordance with the second clock signal, the fourth node is an output terminal of the second control signal generating circuit.

13. The booster circuit according to claim 12, further comprising:

a seventh transistor of the second conductivity type that is connected between the second node and a fifth node;

a second capacitive element that has one end connected to the fifth node, and that is charged with a voltage of the fifth node when the seventh transistor is activated; and a third control signal generating circuit that provides a control terminal of the seventh transistor with a third control signal being in accordance with the first clock signal, wherein when the seventh transistor is de-activated, the second capacitive element boosts a voltage of the fifth node to a negative third voltage by a voltage being applied to other end of the second capacitive element, the voltage applied to the other end being at least ½ as great as the first supply voltage, and the third control signal generating circuit causes a voltage of the third control signal when the seventh transistor is de-activated to be the third voltage of the fifth node, and causes a voltage of the third control signal when the seventh transistor is activated to be a voltage, difference between the voltage and the third voltage being equal to or smaller than a value of the first supply voltage.

14. The booster circuit according to claim 13, further comprising:

an eighth transistor of the second conductivity type that is connected between the fifth node and a sixth node; and a fourth control signal generating circuit that provides a control terminal of the eighth transistor with a fourth control signal being in accordance with the second clock signal, and that activates the eighth transistor when the seventh transistor is de-activated, wherein the fourth control signal generating circuit sets a voltage of the fourth control signal when the eighth transistor is de-activated to be a fourth voltage of the sixth node, and sets a voltage of the fourth control signal when the eighth transistor is activated to be a voltage, difference between the voltage and the fourth voltage being equal to or smaller than a value of the first supply voltage.

15. The booster circuit according to claim 14, wherein the third control signal generating circuit includes ninth to fourteenth transistors of the first conductivity type, fifteenth to eighteenth transistors of the second conductivity type, third and fourth inverter circuits, and third to sixth voltage supply terminals, the third voltage supply terminal supplies a voltage ½ as great as the first supply voltage, the fourth voltage supply terminal supplies a voltage of the second node, the fifth voltage supply terminal supplies the ground voltage, the sixth voltage supply terminal supplies a voltage of the fifth node, a high-potential supply voltage of the third inverter circuit is a voltage of the first voltage supply terminal, and a low-potential supply voltage of the third inverter circuit is the ground voltage, the third inverter circuit receiving at its input a signal being in accordance with the second clock signal, a high-potential supply voltage of the fourth inverter circuit is a voltage of the first voltage supply terminal, and a low-potential supply voltage of the fourth inverter circuit is the ground voltage, the fourth inverter circuit receiving at its input an output of the third inverter circuit, the ninth transistor is connected between the third voltage supply terminal and a seventh node, the ninth transistor receiving at its control terminal an output of the third inverter circuit, the tenth transistor is connected between the third voltage supply terminal and an eighth node, the tenth transistor receiving at its control terminal an output of the fourth inverter circuit, the fifteenth transistor is connected between the seventh node and the fourth voltage supply terminal, the fifteenth transistor having its control terminal connected to the eighth node, the sixteenth transistor is connected between the eighth node and the fourth voltage supply terminal, the sixteenth transistor having its control terminal connected to the seventh node, the eleventh transistor is connected between the fifth voltage supply terminal and a ninth node, the eleventh transistor having its control terminal connected to the eighth node, the twelfth transistor is connected between the fifth voltage supply terminal and a tenth node, the twelfth transistor having its control terminal connected to the seventh node, the thirteenth transistor is connected between the ninth node and an eleventh node, the thirteenth transistor having its control terminal connected to the fourth voltage supply terminal, the fourteenth transistor is connected between the tenth node and a twelfth node, the fourteenth transistor having its control terminal connected to the fourth voltage supply terminal, the seventeenth transistor is connected between the eleventh node and the sixth voltage supply terminal, the seventeenth transistor having its control terminal connected to the twelfth node, the eighteenth transistor is connected between the twelfth node and the sixth voltage supply terminal, the eighteenth transistor having its control terminal connected to the eleventh node, and the twelfth node is an output terminal of the third control signal generating circuit.

16. The booster circuit according to claim 15, wherein the fourth control signal generating circuit has a circuit structure similarly to a circuit structure of the third control signal generating circuit, except that the fourth voltage supply terminal supplies a voltage of the fifth node, the sixth voltage supply terminal supplies a voltage of the sixth node, the third inverter circuit receives at its input a signal being in accordance with the second clock signal, and the twelfth node is an output terminal of the fourth control signal generating circuit.

* * * * *